United States Patent [19]

Maggi

[11] 4,163,871

[45] Aug. 7, 1979

[54] DIGITAL CVSD TELEPHONE CONFERENCE CIRCUIT

[75] Inventor: Charles R. Maggi, Morris Plains, N.J.

[73] Assignee: International Telephone and Telegraph Corporation, Nutley, N.J.

[21] Appl. No.: 863,377

[22] Filed: Dec. 22, 1977

[51] Int. Cl.² ............................................. H04M 3/56
[52] U.S. Cl. .................................................. 179/1 CN
[58] Field of Search .......................... 179/1 CN, 1 H; 325/38 B; 332/11 D; 364/378

[56] References Cited

U.S. PATENT DOCUMENTS

| | | | |
|---|---|---|---|
| 3,885,100 | 5/1975 | Stidham | 179/1 CN |
| 3,970,797 | 7/1976 | Johnson et al. | 179/1 CN |
| 3,979,676 | 9/1976 | Poma | 325/38 B |

Primary Examiner—Kathleen H. Claffy
Assistant Examiner—E. S. Kemeny
Attorney, Agent, or Firm—John T. O'Halloran; Alfred C. Hill

[57] ABSTRACT

A six-telephone channel conference system features an all-digital CVSD (continuously variable slope delta modulation) conference bridge-like circuit. The delta modulation pulse train in each channel is transformed into a series of slope numbers which are processed by the conference circuit addition function to provide zero insertion loss, then by the subtraction function to provide 100% cancellation of a talker's voice to his ear. Transformation involves a sequential three-bit algorithm.

37 Claims, 3 Drawing Figures

DIGITAL CVSD TELEPHONE CONFERENCE CIRCUIT

BACKGROUND OF THE INVENTION

The present invention relates to telephone conference bridges and more particularly to a digital telephone conference circuit.

SUMMARY OF THE INVENTION

An object of the present invention is to provide an all digital CVSD (continuously variable slope delta modulation) full duplex telephone conference circuit.

Another object of the present invention is to provide an all digital CVSD telephone conference circuit employing the three bit algorithm of my copending application Ser. No. 734,854, filed Oct. 22, 1976, now U.S. Pat. No. 4,091,452, whose disclosure is incorporated herein by reference.

Although described therein as a "CVSD Circuit", the concept for digital instantaneous slope addition works for any form of delta modulation. The analog-to-digital converter (encoder) and the digital-to-analog converter (decoder) in any form of delta modulation perform the necessary gain changes (if any) as well as determine the null signal levels. The circuit addition and subtraction functions work on the digital bit streams only and rely on the decoders to establish the null as well as reconstruct the analog signal. The operation of the addition function provides zero insertion loss and the subtraction function yields 100% cancellation of a talker's voice to his ear.

A feature of the present invention is the provision of an all digital delta modulation telephone conference circuit comprising: first digital means to separately store in succession a plurality of different adjacent bits of a plurality of input delta modulation bit streams each originating from a different one of a plurality of phones, each of the plurality of bits being capable of having a plurality of different bit combinations, each of the plurality of different bit combinations being assigned a predetermined slope number; and second digital means coupled to the first means for sequentially receiving each of the plurality of bits, for adding sequentially first binary bit combinations determined by the slope number assigned to each of the received plurality of bits to produce a sum digital signal including information from each of the phones, and for subtracting sequentially second binary bit combinations determined by the slope number assigned to each of the received plurality of bits from the sum digital signal to produce a plurality of output conference delta modulation bit streams each for a different one of the plurality of phones and each including information from all of the plurality of phones minus information from the associated one of the plurality of phones.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
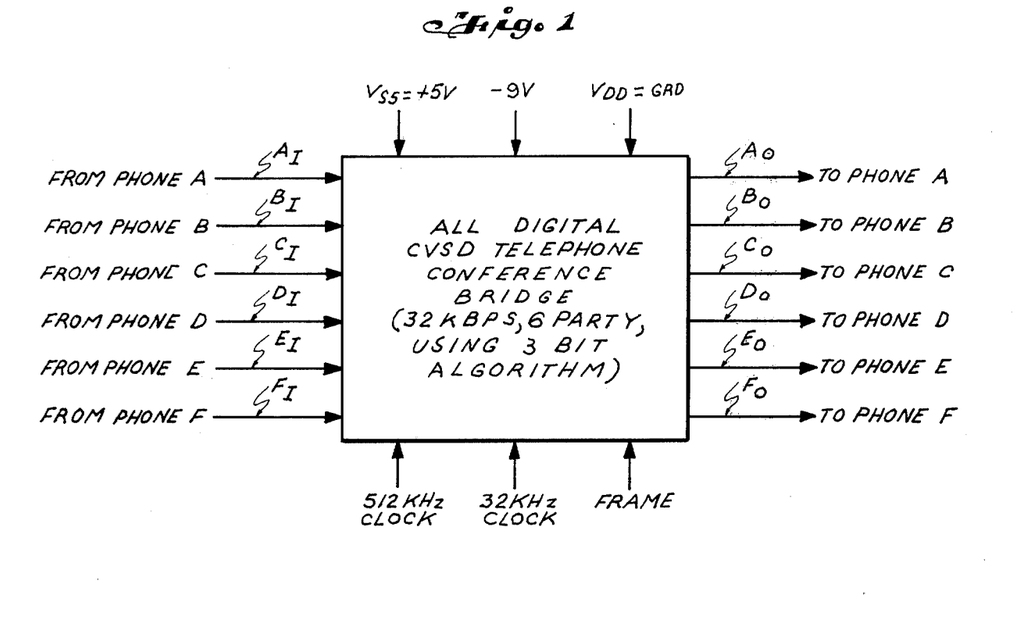
FIG. 1 is a basic block diagram of the CVSD telephone conference circuit in accordance with the principles of the present invention.

Referring to FIG. 1 there is disclosed therein LSI (large scale integrated circuit) package of the all digital CVSD telephone conference circuit of the present invention to enable six telephones to have a conference. The conference circuit receives six baseband CVSD bit streams, one from each of the phones $A_I$ to $F_I$, having a bit rate of 32 KBPS (kilobits per second). The conference circuit operates to add the bits streams together and substract the bit stream of each phone from the added bit stream so that the intelligence of each phone is not returned to itself on the conference bit steams $A_o$ to $F_o$. The operation of the CVSD telephone conference circuit of this invention employs the three bit algorithm of the above-cited copending application and provides the outputs $A_o$ to $F_o$ as set forth in the following equations.

$$A_o = \Sigma B_I \cdot C_I \cdot D_I \cdot E_I \cdot F_I$$

$$B_o = \Sigma A_I \cdot C_I \cdot D_I \cdot E_I \cdot F_I$$

$$C_o = \Sigma A_I \cdot B_I \cdot D_I \cdot E_I \cdot F_I$$

$$D_o = \Sigma A_I \cdot B_I \cdot C_I \cdot E_I \cdot F_I$$

$$E_o = \Sigma A_I \cdot B_I \cdot C_I \cdot D_I \cdot F_I$$

$$F_o = \Sigma A_I \cdot B_I \cdot C_I \cdot D_I \cdot E_I$$

Figure 2:
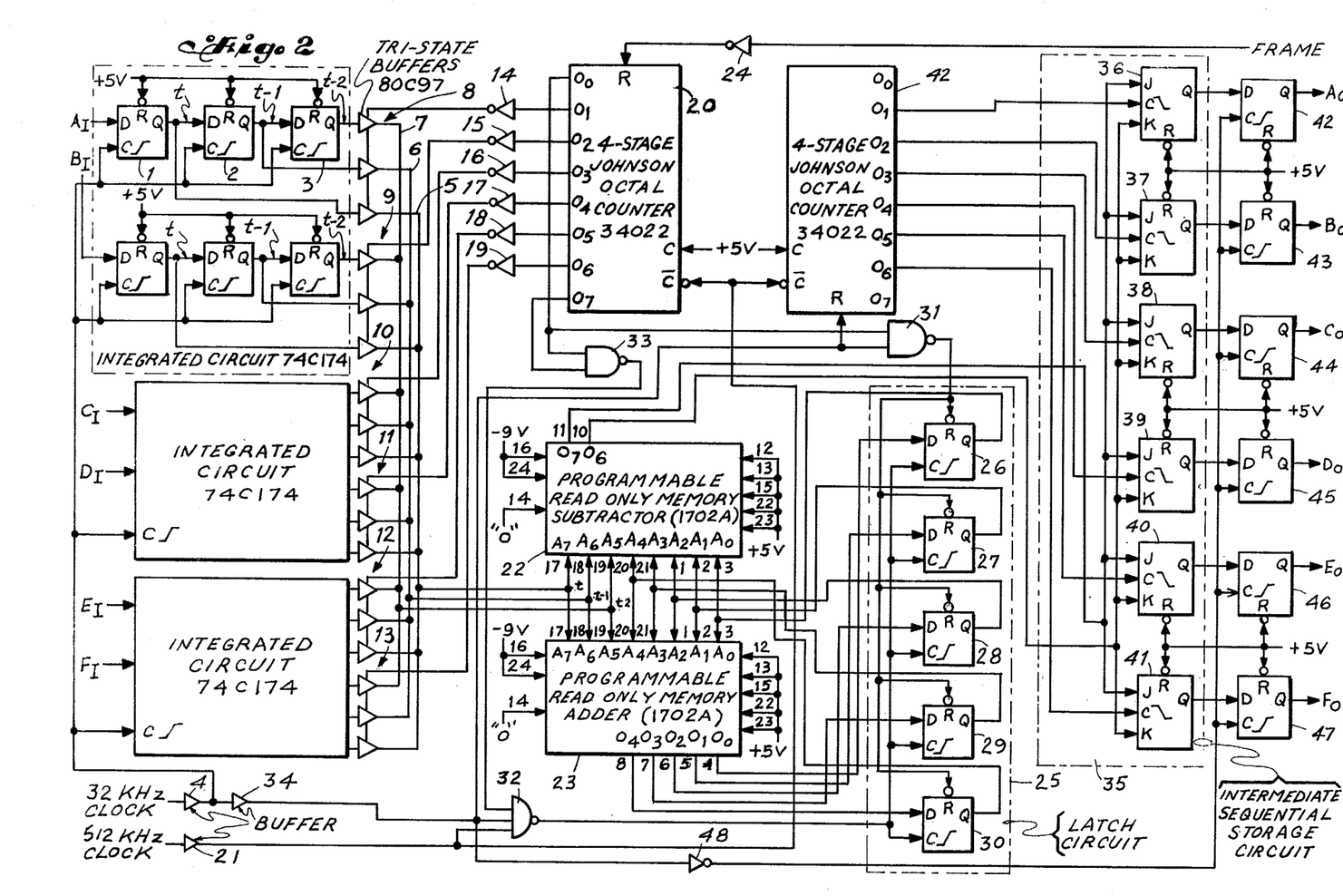
FIG. 2 is a logic diagram of the CVSD telephone conference circuit in accordance with the principles of the present invention.

Referring to FIG. 2 there is illustrated a logic diagram that would be contained in the package of FIG. 1 to provide an all digital CVSD telephone conference circuit in accordance with the principles of the present invention. Each of the input CVSD bit streams of phones $A_I$ and $F_I$ are coupled to three cascade connected D-type flip flops, such as flip flops 1-3 coupled to the input from phone $A_I$. Two groups of three cascade connected D-type flip flops are present in one integrated circuit, such as model 74C174 available from National Semiconductor. Flip flop 1 stores the present bit t, flip flop 2 stores the adjacent previous bit t-1 and flip flop 3 stores the adjacent bit from the previous bit t-2. The bits from the bit stream are shifted through flip flops 1-3 at a 32 KHz (kilohertz) rate by the 32 KHz clock (Curve J, FIG. 3) coupled from buffer 4. The three bits stored in flip flops 1-3 can have eight different bit combinations each of which are assigned a slope number. The slope numbers are then added together to directly add two CVSD bit streams together. This is the basis of the three bit algorithm of the above-cited copending application. It should be noted from Curve J, FIG. 3 that the conference circuit of this invention operates in a subtract phase first and then in an add phase for each bit period.

Figure 3:
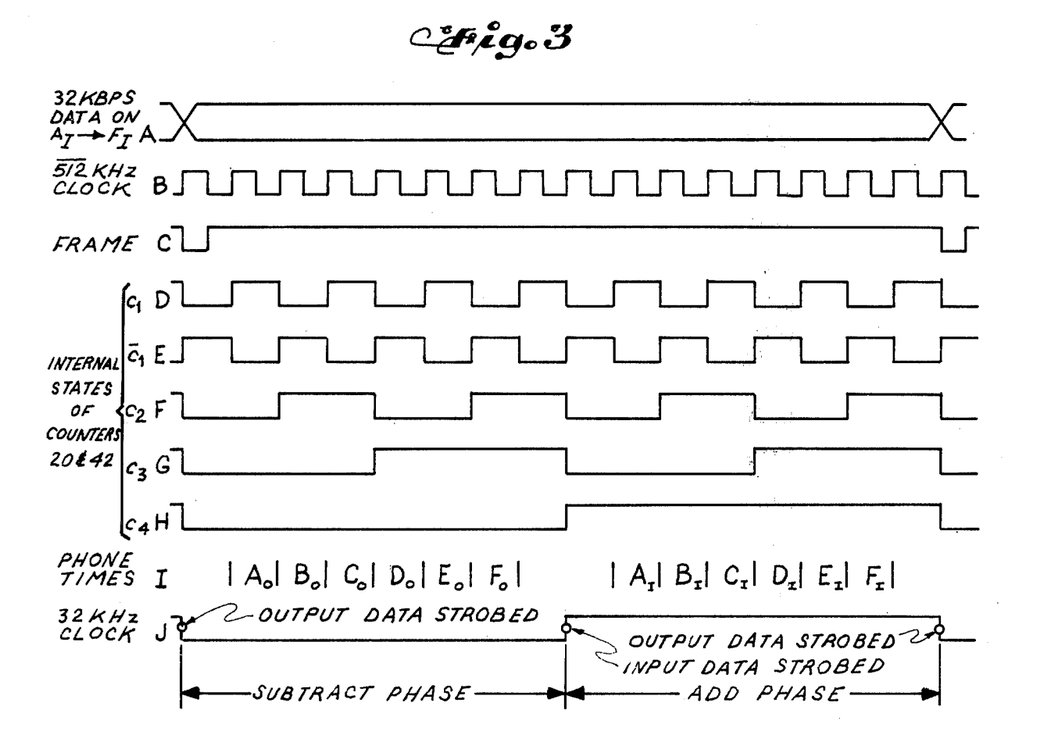
FIG. 3 is a timing diagram useful in explaining the operation of the logic diagram of FIG. 2.

The bits stored for each bit stream from phones $A_I$ to $F_I$ are sequentially coupled to buses 5-7 by means of the tri-state buffers 8-13 under control of timing signals present at the output of inverters 14-19 coupled to the $O_1$ to $O_6$ outputs of a four-stage Johnson octal counter 20 clocked by the 512 KHz clock (Curve B, FIG. 3)

coupled through buffer 21. The internal states of counter 20 are shown in Curves D to H, FIG. 3 and the timing signal of Curve E, FIG. 3 inverted by inverters 14, 16 and 18 enables tri-state buffers 8, 10 and 12 in sequence while the timing signal of Curve D, FIG. 3, inverted by inverters 15, 17 and 19 enables tri-state buffers 9, 11 and 13 with the positive pulses of these inverted timing signals corresponding to the phone times of Curve I, FIG. 3. Buses 5-7 couple the stored CVSD bits when the associated tri-state buffers are enabled to the three most significant adders bit inputs $A_7$, $A_6$ and $A_5$ of programmable read only memory subtractor 22 and programmable read only memory adder 23. Counter 20 operates during both the add phase and subtract phase and is reset by the frame signal (Curve C, FIG. 3) after being inverted by inverter 24.

Tri-state buffers 8-13 have three output states, logic "1", logic "0" and a high impedance (open). Buffers 8-13 may be integrated circuit model 80C97 available from National Semiconductor. Counter 70 may be integrated circuit model 34022 available from Fairchild. Subtractor 22 and adder 23 may be integrated circuits model 1702A available from Intel.

A latch circuit 25 including five D-type flip flops 26-30 are coupled between the five least significant bit outputs $O_0$ to $O_4$ of adder 23 and the five least significant address bit inputs $A_0$ to $A_4$ of both adder 23 and subtractor 22. Flip flops 26-30 are reset at the start of the add phase to provide a logic "0" at all of the Q outputs by the output signal of NAND gate 31 and clocked on the upward transition of the output signal of NAND gate 32 which receives one input signal from the output of NAND gate 33, a second input from buffer 34 passing the 32 KHz clock and a third input from buffer 21 passing the 512 KHz clock. Circuit 25 provides a running sum of the least significant bits as the phones are sequentially coupled to adder 23 from buses 5-7.

During the subtract phase the bits from the phones which are sequentially coupled to subtractor 22 and the two most significant bit outputs are coupled after each subtraction to an intermediate sequential storage circuit 35 including JK flip flops 36-41 which are clocked on the falling transition of timing signals from a 4 stage Johnson octal counter 42. Counter 42 operates like counter 20 only during the subtract phase with the timing signal of Curve D, FIG. 3 clocking flip flops 36, 38 and 40 and the timing signal of Curve E, FIG. 3 clocking flip flops 37, 39 and 41 with the positive pulses of these timing signals corresponding to phone times of Curve I, FIG. 3. During the add phase, counter 42 is reset to and held at zero by the 32 KHz clock from buffer 34. Counter 42 may be an integrated circuit model 34022 available from Fairchild.

The Q outputs of each of flip-flops 36-41 are connected to a different one of the D inputs of D-type flip flops 42-47 to provide the desired CVSD conference bit stream to a different one of each of the phones A to F minus its own intelligence. Flip flops 42-47 are clocked on the rising transition of the inverted 32 KHz at the output of inverter 48.

Adder 23 and subtractor 22 are each capable of being programmed to contain 256 rows or words of binary bits with each row or word containing 8 binary bits and, hence, a total capacity of 2048 bits. The operation of the conference circuit of the present invention will now be described employing the following sixteen TABLES I to XVI, where TABLES I to VIII illustrate the binary bits programmed into adder 23 for the eight different combinations of bits t, t-1 and t-2 and their associated assigned slope numbers and TABLES IX to XVI illustrate the binary bits programmed into subtractor 22 for the eight different combinations of bits t, t-1 and t-2 and their associated assigned slope numbers.

TABLE I

| ADDRESS | | | | | | | | DATA ASSIGNED SLOPE NUMBER = −2 | | | | | | |
|---|---|---|---|---|---|---|---|---|---|---|---|---|---|---|
| t | t-1 | t-2 | sign | MAG. | | | | | | sign | MAG. | | | |
| $A_7$ | $A_6$ | $A_5$ | $A_4$ | $A_3$ | $A_2$ | $A_1$ | $A_0$ | $O_7$ | $O_6$ | $O_5$ | $O_4$ | $O_3$ | $O_2$ $O_1$ | $O_0$ |
| 0 | 0 | 0 | 0 | 0 | 0 | 0 | 0 | | | | 0 | 0 | 0 1 | 0 |
| 0 | 0 | 0 | 0 | 0 | 0 | 0 | 1 | | | | 0 | 0 | 0 1 | 1 |
| 0 | 0 | 0 | 0 | 0 | 0 | 0 | 1 | | | | 0 | 0 | 0 1 | 1 |
| 0 | 0 | 0 | 0 | 0 | 0 | 1 | 0 | | | | 0 | 0 | 1 0 | 0 |
| 0 | 0 | 0 | 0 | 0 | 0 | 1 | 1 | | | | 0 | 0 | 1 0 | 1 |
| 0 | 0 | 0 | 0 | 0 | 1 | 0 | 0 | | | | 0 | 0 | 1 1 | 0 |
| 0 | 0 | 0 | 0 | 0 | 1 | 0 | 1 | | | | 0 | 0 | 1 1 | 1 |
| 0 | 0 | 0 | 0 | 0 | 1 | 1 | 0 | | | | 0 | 1 | 0 0 | 0 |
| 0 | 0 | 0 | 0 | 0 | 1 | 1 | 1 | | | | 0 | 1 | 0 0 | 1 |
| 0 | 0 | 0 | 0 | 1 | 0 | 0 | 0 | | | | 0 | 1 | 0 1 | 0 |
| 0 | 0 | 0 | 0 | 1 | 0 | 0 | 1 | | | | 0 | 1 | 0 1 | 1 |
| 0 | 0 | 0 | 0 | 1 | 0 | 1 | 0 | | | | 0 | 1 | 1 0 | 0 |
| 0 | 0 | 0 | 0 | 1 | 0 | 1 | 1 | | | | 0 | 1 | 1 0 | 1 |
| 0 | 0 | 0 | 0 | 1 | 1 | 0 | 0 | | | | 0 | 1 | 1 1 | 0 |
| 0 | 0 | 0 | 0 | 1 | 1 | 0 | 1 | | | | 0 | 1 | 1 1 | 1 |
| 0 | 0 | 0 | 0 | 1 | 1 | 1 | 0 | | | | 0 | 1 | 1 1 | 1 |
| 0 | 0 | 0 | 0 | 1 | 1 | 1 | 1 | | | | 0 | 1 | 1 1 | 1 |
| 0 | 0 | 0 | 1 | 0 | 0 | 0 | 0 | | | | 0 | 0 | 0 1 | 0 |
| 0 | 0 | 0 | 1 | 0 | 0 | 0 | 1 | | | | 0 | 0 | 0 0 | 1 |
| 0 | 0 | 0 | 1 | 0 | 0 | 1 | 0 | | | | 0 | 0 | 0 0 | 0 |
| 0 | 0 | 0 | 1 | 0 | 0 | 1 | 1 | | | | 1 | 0 | 0 0 | 1 |
| 0 | 0 | 0 | 1 | 0 | 1 | 0 | 0 | | | | 1 | 0 | 0 1 | 0 |
| 0 | 0 | 0 | 1 | 0 | 1 | 0 | 1 | | | | 1 | 0 | 0 1 | 1 |
| 0 | 0 | 0 | 1 | 0 | 1 | 1 | 0 | | | | 1 | 0 | 1 0 | 0 |
| 0 | 0 | 0 | 1 | 0 | 1 | 1 | 1 | | | | 1 | 0 | 1 0 | 1 |
| 0 | 0 | 0 | 1 | 1 | 0 | 0 | 0 | | | | 1 | 0 | 1 1 | 0 |
| 0 | 0 | 0 | 1 | 1 | 0 | 0 | 1 | | | | 1 | 0 | 1 1 | 1 |
| 0 | 0 | 0 | 1 | 1 | 0 | 1 | 0 | | | | 1 | 1 | 0 0 | 0 |
| 0 | 0 | 0 | 1 | 1 | 0 | 1 | 1 | | | | 1 | 1 | 0 0 | 1 |

TABLE I-continued

ASSIGNED SLOPE NUMBER = −2

| ADDRESS | | | | | | | | DATA | | | | | |
|---|---|---|---|---|---|---|---|---|---|---|---|---|---|
| t | t-1 | t-2 | sign | MAG. | | | | sign | MAG. | | | | |
| $A_7$ | $A_6$ | $A_5$ | $A_4$ | $A_3$ | $A_2$ | $A_1$ | $A_0$ | $O_7$ $O_6$ $O_5$ | $O_4$ | $O_3$ | $O_2$ | $O_1$ | $O_0$ |
| 0 | 0 | 0 | 1 | 1 | 1 | 0 | 0 | | 1 | 1 | 0 | 1 | 0 |
| 0 | 0 | 0 | 1 | 1 | 1 | 0 | 1 | | 1 | 1 | 0 | 1 | 1 |
| 0 | 0 | 0 | 1 | 1 | 1 | 1 | 0 | | 1 | 1 | 1 | 0 | 0 |
| 0 | 0 | 0 | 1 | 1 | 1 | 1 | 1 | | 1 | 1 | 1 | 0 | 1 |

TABLE II

ASSIGNED SLOPE NUMBER = −1

| ADDRESS | | | | | | | | DATA | | | | | |
|---|---|---|---|---|---|---|---|---|---|---|---|---|---|
| t | t-1 | t-2 | sign | MAG. | | | | sign | MAG. | | | | |
| $A_7$ | $A_6$ | $A_5$ | $A_4$ | $A_3$ | $A_2$ | $A_1$ | $A_0$ | $O_7$ $O_6$ $O_5$ | $O_4$ | $O_3$ | $O_2$ | $O_1$ | $O_0$ |
| 0 | 0 | 1 | 0 | 0 | 0 | 0 | 0 | | 0 | 0 | 0 | 0 | 1 |
| 0 | 0 | 1 | 0 | 0 | 0 | 0 | 1 | | 0 | 0 | 0 | 1 | 0 |
| 0 | 0 | 1 | 0 | 0 | 0 | 1 | 0 | | 0 | 0 | 0 | 1 | 1 |
| 0 | 0 | 1 | 0 | 0 | 0 | 1 | 1 | | 0 | 0 | 1 | 0 | 0 |
| 0 | 0 | 1 | 0 | 0 | 1 | 0 | 0 | | 0 | 0 | 1 | 0 | 1 |
| 0 | 0 | 1 | 0 | 0 | 1 | 0 | 1 | | 0 | 0 | 1 | 1 | 0 |
| 0 | 0 | 1 | 0 | 0 | 1 | 1 | 0 | | 0 | 0 | 1 | 1 | 1 |
| 0 | 0 | 1 | 0 | 0 | 1 | 1 | 1 | | 0 | 1 | 0 | 0 | 0 |
| 0 | 0 | 1 | 0 | 1 | 0 | 0 | 0 | | 0 | 1 | 0 | 0 | 1 |
| 0 | 0 | 1 | 0 | 1 | 0 | 0 | 1 | | 0 | 1 | 0 | 1 | 0 |
| 0 | 0 | 1 | 0 | 1 | 0 | 1 | 0 | | 0 | 1 | 0 | 1 | 1 |
| 0 | 0 | 1 | 0 | 1 | 0 | 1 | 1 | | 0 | 1 | 1 | 0 | 0 |
| 0 | 0 | 1 | 0 | 1 | 1 | 0 | 0 | | 0 | 1 | 1 | 0 | 1 |
| 0 | 0 | 1 | 0 | 1 | 1 | 0 | 1 | | 0 | 1 | 1 | 1 | 0 |
| 0 | 0 | 1 | 0 | 1 | 1 | 1 | 0 | | 0 | 1 | 1 | 1 | 1 |
| 0 | 0 | 1 | 0 | 1 | 1 | 1 | 1 | | 0 | 1 | 1 | 1 | 1 |
| 0 | 0 | 1 | 1 | 0 | 0 | 0 | 0 | | 0 | 0 | 0 | 0 | 1 |
| 0 | 0 | 1 | 1 | 0 | 0 | 0 | 1 | | 0 | 0 | 0 | 0 | 0 |
| 0 | 0 | 1 | 1 | 0 | 0 | 1 | 0 | | 1 | 0 | 0 | 0 | 1 |
| 0 | 0 | 1 | 1 | 0 | 0 | 1 | 1 | | 1 | 0 | 0 | 1 | 0 |
| 0 | 0 | 1 | 1 | 0 | 1 | 0 | 0 | | 1 | 0 | 0 | 1 | 1 |
| 0 | 0 | 1 | 1 | 0 | 1 | 0 | 1 | | 1 | 0 | 1 | 0 | 0 |
| 0 | 0 | 1 | 1 | 0 | 1 | 1 | 0 | | 1 | 0 | 1 | 0 | 1 |
| 0 | 0 | 1 | 1 | 0 | 1 | 1 | 1 | | 1 | 0 | 1 | 1 | 0 |
| 0 | 0 | 1 | 1 | 1 | 0 | 0 | 0 | | 1 | 0 | 1 | 1 | 1 |
| 0 | 0 | 1 | 1 | 1 | 0 | 0 | 1 | | 1 | 1 | 0 | 0 | 0 |
| 0 | 0 | 1 | 1 | 1 | 0 | 1 | 0 | | 1 | 1 | 0 | 0 | 1 |
| 0 | 0 | 1 | 1 | 1 | 0 | 1 | 1 | | 1 | 1 | 0 | 1 | 0 |
| 0 | 0 | 1 | 1 | 1 | 1 | 0 | 0 | | 1 | 1 | 0 | 1 | 1 |
| 0 | 0 | 1 | 1 | 1 | 1 | 0 | 1 | | 1 | 1 | 1 | 0 | 0 |
| 0 | 0 | 1 | 1 | 1 | 1 | 1 | 0 | | 1 | 1 | 1 | 0 | 1 |
| 0 | 0 | 1 | 1 | 1 | 1 | 1 | 1 | | 1 | 1 | 1 | 1 | 0 |

TABLE III

ASSIGNED SLOPE NUMBER = 0

| ADDRESS | | | | | | | | DATA | | | | | |
|---|---|---|---|---|---|---|---|---|---|---|---|---|---|
| t | t-1 | t-2 | sign | MAG. | | | | sign | MAG. | | | | |
| $A_7$ | $A_6$ | $A_5$ | $A_4$ | $A_3$ | $A_2$ | $A_1$ | $A_0$ | $O_7$ $O_6$ $O_5$ | $O_4$ | $O_3$ | $O_2$ | $O_1$ | $O_0$ |
| 0 | 1 | 0 | 0 | 0 | 0 | 0 | 0 | | 0 | 0 | 0 | 0 | 0 |
| 0 | 1 | 0 | 0 | 0 | 0 | 0 | 1 | | 0 | 0 | 0 | 0 | 1 |
| 0 | 1 | 0 | 0 | 0 | 0 | 1 | 0 | | 0 | 0 | 0 | 1 | 0 |
| 0 | 1 | 0 | 0 | 0 | 0 | 1 | 1 | | 0 | 0 | 0 | 1 | 1 |
| 0 | 1 | 0 | 0 | 0 | 1 | 0 | 0 | | 0 | 0 | 1 | 0 | 0 |
| 0 | 1 | 0 | 0 | 0 | 1 | 0 | 1 | | 0 | 0 | 1 | 0 | 1 |
| 0 | 1 | 0 | 0 | 0 | 1 | 1 | 0 | | 0 | 0 | 1 | 1 | 0 |
| 0 | 1 | 0 | 0 | 0 | 1 | 1 | 1 | | 0 | 0 | 1 | 1 | 1 |
| 0 | 1 | 0 | 0 | 1 | 0 | 0 | 0 | | 0 | 1 | 0 | 0 | 0 |
| 0 | 1 | 0 | 0 | 1 | 0 | 0 | 1 | | 0 | 1 | 0 | 0 | 1 |
| 0 | 1 | 0 | 0 | 1 | 0 | 1 | 0 | | 0 | 1 | 0 | 1 | 0 |
| 0 | 1 | 0 | 0 | 1 | 0 | 1 | 1 | | 0 | 1 | 0 | 1 | 1 |
| 0 | 1 | 0 | 0 | 1 | 1 | 0 | 0 | | 0 | 1 | 1 | 0 | 0 |
| 0 | 1 | 0 | 0 | 1 | 1 | 0 | 1 | | 0 | 1 | 1 | 0 | 1 |
| 0 | 1 | 0 | 0 | 1 | 1 | 1 | 0 | | 0 | 1 | 1 | 1 | 0 |
| 0 | 1 | 0 | 0 | 1 | 1 | 1 | 1 | | 0 | 1 | 1 | 1 | 1 |
| 0 | 1 | 0 | 1 | 0 | 0 | 0 | 0 | | 0 | 0 | 0 | 0 | 0 |
| 0 | 1 | 0 | 1 | 0 | 0 | 0 | 1 | | 1 | 0 | 0 | 0 | 1 |
| 0 | 1 | 0 | 1 | 0 | 0 | 1 | 0 | | 1 | 0 | 0 | 1 | 0 |
| 0 | 1 | 0 | 1 | 0 | 0 | 1 | 1 | | 1 | 0 | 0 | 1 | 1 |

TABLE III-continued

ASSIGNED SLOPE NUMBER = 0

| ADDRESS | | | | | | | | DATA | | | | | | | |
|---|---|---|---|---|---|---|---|---|---|---|---|---|---|---|---|
| t | t-1 | t-2 | sign | | MAG. | | | | | | sign | | MAG. | | |
| $A_7$ | $A_6$ | $A_5$ | $A_4$ | $A_3$ | $A_2$ | $A_1$ | $A_0$ | $O_7$ | $O_6$ | $O_5$ | $O_4$ | $O_3$ | $O_2$ | $O_1$ | $O_0$ |
| 0 | 1 | 0 | 1 | 0 | 1 | 0 | 0 | | | | 1 | 0 | 1 | 0 | 0 |
| 0 | 1 | 0 | 1 | 0 | 1 | 0 | 1 | | | | 1 | 0 | 1 | 0 | 1 |
| 0 | 1 | 0 | 1 | 0 | 1 | 1 | 0 | | | | 1 | 0 | 1 | 1 | 0 |
| 0 | 1 | 0 | 1 | 0 | 1 | 1 | 1 | | | | 1 | 0 | 1 | 1 | 1 |
| 0 | 1 | 0 | 1 | 1 | 0 | 0 | 0 | | | | 1 | 1 | 0 | 0 | 0 |
| 0 | 1 | 0 | 1 | 1 | 0 | 0 | 1 | | | | 1 | 1 | 0 | 0 | 1 |
| 0 | 1 | 0 | 1 | 1 | 0 | 1 | 0 | | | | 1 | 1 | 0 | 1 | 0 |
| 0 | 1 | 0 | 1 | 1 | 0 | 1 | 1 | | | | 1 | 1 | 0 | 1 | 1 |
| 0 | 1 | 0 | 1 | 1 | 1 | 0 | 0 | | | | 1 | 1 | 1 | 0 | 0 |
| 0 | 1 | 0 | 1 | 1 | 1 | 0 | 1 | | | | 1 | 1 | 1 | 0 | 1 |
| 0 | 1 | 0 | 1 | 1 | 1 | 1 | 0 | | | | 1 | 1 | 1 | 1 | 0 |
| 0 | 1 | 0 | 1 | 1 | 1 | 1 | 1 | | | | 1 | 1 | 1 | 1 | 1 |

TABLE IV

ASSIGNED SLOPE NUMBER = 0

| ADDRESS | | | | | | | | DATA | | | | | | | |
|---|---|---|---|---|---|---|---|---|---|---|---|---|---|---|---|
| t | t-1 | t-2 | sign | | MAG. | | | | | | sign | | MAG. | | |
| $A_7$ | $A_6$ | $A_5$ | $A_4$ | $A_3$ | $A_2$ | $A_1$ | $A_0$ | $O_7$ | $O_6$ | $O_5$ | $O_4$ | $O_3$ | $O_2$ | $O_1$ | $O_0$ |
| 0 | 1 | 1 | 0 | 0 | 0 | 0 | 0 | | | | 0 | 0 | 0 | 0 | 0 |
| 0 | 1 | 1 | 0 | 0 | 0 | 0 | 1 | | | | 0 | 0 | 0 | 0 | 1 |
| 0 | 1 | 1 | 0 | 0 | 0 | 1 | 0 | | | | 0 | 0 | 0 | 1 | 0 |
| 0 | 1 | 1 | 0 | 0 | 0 | 1 | 1 | | | | 0 | 0 | 0 | 1 | 1 |
| 0 | 1 | 1 | 0 | 0 | 1 | 0 | 0 | | | | 0 | 0 | 1 | 0 | 0 |
| 0 | 1 | 1 | 0 | 0 | 1 | 0 | 1 | | | | 0 | 0 | 1 | 0 | 1 |
| 0 | 1 | 1 | 0 | 0 | 1 | 1 | 0 | | | | 0 | 0 | 1 | 1 | 0 |
| 0 | 1 | 1 | 0 | 0 | 1 | 1 | 1 | | | | 0 | 0 | 1 | 1 | 1 |
| 0 | 1 | 1 | 0 | 1 | 0 | 0 | 0 | | | | 0 | 1 | 0 | 0 | 0 |
| 0 | 1 | 1 | 0 | 1 | 0 | 0 | 1 | | | | 0 | 1 | 0 | 0 | 1 |
| 0 | 1 | 1 | 0 | 1 | 0 | 1 | 0 | | | | 0 | 1 | 0 | 1 | 0 |
| 0 | 1 | 1 | 0 | 1 | 0 | 1 | 1 | | | | 0 | 1 | 0 | 1 | 1 |
| 0 | 1 | 1 | 0 | 1 | 1 | 0 | 0 | | | | 0 | 1 | 1 | 0 | 0 |
| 0 | 1 | 1 | 0 | 1 | 1 | 0 | 1 | | | | 0 | 1 | 1 | 0 | 1 |
| 0 | 1 | 1 | 0 | 1 | 1 | 1 | 0 | | | | 0 | 1 | 1 | 1 | 0 |
| 0 | 1 | 1 | 0 | 1 | 1 | 1 | 1 | | | | 0 | 1 | 1 | 1 | 1 |
| 0 | 1 | 1 | 1 | 0 | 0 | 0 | 0 | | | | 0 | 0 | 0 | 0 | 0 |
| 0 | 1 | 1 | 1 | 0 | 0 | 0 | 1 | | | | 1 | 0 | 0 | 0 | 1 |
| 0 | 1 | 1 | 1 | 0 | 0 | 1 | 0 | | | | 1 | 0 | 0 | 1 | 0 |
| 0 | 1 | 1 | 1 | 0 | 0 | 1 | 1 | | | | 1 | 0 | 0 | 1 | 1 |
| 0 | 1 | 1 | 1 | 0 | 1 | 0 | 0 | | | | 1 | 0 | 1 | 0 | 0 |
| 0 | 1 | 1 | 1 | 0 | 1 | 0 | 1 | | | | 1 | 0 | 1 | 0 | 1 |
| 0 | 1 | 1 | 1 | 0 | 1 | 1 | 0 | | | | 1 | 0 | 1 | 1 | 0 |
| 0 | 1 | 1 | 1 | 0 | 1 | 1 | 1 | | | | 1 | 0 | 1 | 1 | 1 |
| 0 | 1 | 1 | 1 | 1 | 0 | 0 | 0 | | | | 1 | 1 | 0 | 0 | 0 |
| 0 | 1 | 1 | 1 | 1 | 0 | 0 | 1 | | | | 1 | 1 | 0 | 0 | 1 |
| 0 | 1 | 1 | 1 | 1 | 0 | 1 | 0 | | | | 1 | 1 | 0 | 1 | 0 |
| 0 | 1 | 1 | 1 | 1 | 0 | 1 | 1 | | | | 1 | 1 | 0 | 1 | 1 |
| 0 | 1 | 1 | 1 | 1 | 1 | 0 | 0 | | | | 1 | 1 | 1 | 0 | 0 |
| 0 | 1 | 1 | 1 | 1 | 1 | 0 | 1 | | | | 1 | 1 | 1 | 0 | 1 |
| 0 | 1 | 1 | 1 | 1 | 1 | 1 | 0 | | | | 1 | 1 | 1 | 1 | 0 |
| 0 | 1 | 1 | 1 | 1 | 1 | 1 | 1 | | | | 1 | 1 | 1 | 1 | 1 |

TABLE V

ASSIGNED SLOPE NUMBER = 0

| ADDRESS | | | | | | | | DATA | | | | | | | |
|---|---|---|---|---|---|---|---|---|---|---|---|---|---|---|---|
| t | t-1 | t-2 | sign | | MAG. | | | | | | sign | | MAG. | | |
| $A_7$ | $A_6$ | $A_5$ | $A_4$ | $A_3$ | $A_2$ | $A_1$ | $A_0$ | $O_7$ | $O_6$ | $O_5$ | $O_4$ | $O_3$ | $O_2$ | $O_1$ | $O_0$ |
| 1 | 0 | 0 | 0 | 0 | 0 | 0 | 0 | | | | 0 | 0 | 0 | 0 | 0 |
| 1 | 0 | 0 | 0 | 0 | 0 | 0 | 1 | | | | 0 | 0 | 0 | 0 | 1 |
| 1 | 0 | 0 | 0 | 0 | 0 | 1 | 0 | | | | 0 | 0 | 0 | 1 | 0 |
| 1 | 0 | 0 | 0 | 0 | 0 | 1 | 1 | | | | 0 | 0 | 0 | 1 | 1 |
| 1 | 0 | 0 | 0 | 0 | 1 | 0 | 0 | | | | 0 | 0 | 1 | 0 | 0 |
| 1 | 0 | 0 | 0 | 0 | 1 | 0 | 1 | | | | 0 | 0 | 1 | 0 | 1 |
| 1 | 0 | 0 | 0 | 0 | 1 | 1 | 0 | | | | 0 | 0 | 1 | 1 | 0 |
| 1 | 0 | 0 | 0 | 0 | 1 | 1 | 1 | | | | 0 | 0 | 1 | 1 | 1 |
| 1 | 0 | 0 | 0 | 1 | 0 | 0 | 0 | | | | 0 | 1 | 0 | 0 | 0 |
| 1 | 0 | 0 | 0 | 1 | 0 | 0 | 1 | | | | 0 | 1 | 0 | 0 | 1 |
| 1 | 0 | 0 | 0 | 1 | 0 | 1 | 0 | | | | 0 | 1 | 0 | 1 | 0 |
| 1 | 0 | 0 | 0 | 1 | 0 | 1 | 1 | | | | 0 | 1 | 0 | 1 | 1 |

TABLE V-continued

ASSIGNED SLOPE NUMBER = 0

| ADDRESS | | | | | | | | DATA | | | | | |
|---|---|---|---|---|---|---|---|---|---|---|---|---|---|
| t | t-1 | t-2 | sign | | MAG. | | | sign | | MAG. | | | |
| $A_7$ | $A_6$ | $A_5$ | $A_4$ | $A_3$ | $A_2$ | $A_1$ | $A_0$ | $O_7$ $O_6$ $O_5$ | $O_4$ | $O_3$ | $O_2$ | $O_1$ | $O_0$ |
| 1 | 0 | 0 | 0 | 1 | 1 | 0 | 0 | | 0 | 1 | 1 | 0 | 0 |
| 1 | 0 | 0 | 0 | 1 | 1 | 0 | 1 | | 0 | 1 | 1 | 0 | 1 |
| 1 | 0 | 0 | 0 | 1 | 1 | 1 | 0 | | 0 | 1 | 1 | 1 | 0 |
| 1 | 0 | 0 | 0 | 1 | 1 | 1 | 1 | | 0 | 1 | 1 | 1 | 1 |
| 1 | 0 | 0 | 1 | 0 | 0 | 0 | 0 | | 0 | 0 | 0 | 0 | 0 |
| 1 | 0 | 0 | 1 | 0 | 0 | 0 | 1 | | 1 | 0 | 0 | 0 | 1 |
| 1 | 0 | 0 | 1 | 0 | 0 | 1 | 0 | | 1 | 0 | 0 | 1 | 0 |
| 1 | 0 | 0 | 1 | 0 | 0 | 1 | 1 | | 1 | 0 | 0 | 1 | 1 |
| 1 | 0 | 0 | 1 | 0 | 1 | 0 | 0 | | 1 | 0 | 1 | 0 | 0 |
| 1 | 0 | 0 | 1 | 0 | 1 | 0 | 1 | | 1 | 0 | 1 | 0 | 1 |
| 1 | 0 | 0 | 1 | 0 | 1 | 1 | 0 | | 1 | 0 | 1 | 1 | 0 |
| 1 | 0 | 0 | 1 | 0 | 1 | 1 | 1 | | 1 | 0 | 1 | 1 | 1 |
| 1 | 0 | 0 | 1 | 1 | 0 | 0 | 0 | | 1 | 1 | 0 | 0 | 0 |
| 1 | 0 | 0 | 1 | 1 | 0 | 0 | 1 | | 1 | 1 | 0 | 0 | 1 |
| 1 | 0 | 0 | 1 | 1 | 0 | 1 | 0 | | 1 | 1 | 0 | 1 | 0 |
| 1 | 0 | 0 | 1 | 1 | 0 | 1 | 1 | | 1 | 1 | 0 | 1 | 1 |
| 1 | 0 | 0 | 1 | 1 | 1 | 0 | 0 | | 1 | 1 | 1 | 0 | 0 |
| 1 | 0 | 0 | 1 | 1 | 1 | 0 | 1 | | 1 | 1 | 1 | 0 | 1 |
| 1 | 0 | 0 | 1 | 1 | 1 | 1 | 0 | | 1 | 1 | 1 | 1 | 0 |
| 1 | 0 | 0 | 1 | 1 | 1 | 1 | 1 | | 1 | 1 | 1 | 1 | 1 |

TABLE VI

ASSIGNED SLOPE NUMBER = 0

| ADDRESS | | | | | | | | DATA | | | | | |
|---|---|---|---|---|---|---|---|---|---|---|---|---|---|
| t | t-1 | t-2 | sign | | MAG. | | | sign | | MAG. | | | |
| $A_7$ | $A_6$ | $A_5$ | $A_4$ | $A_3$ | $A_2$ | $A_1$ | $A_0$ | $O_7$ $O_6$ $O_5$ | $O_4$ | $O_3$ | $O_2$ | $O_1$ | $O_0$ |
| 1 | 0 | 1 | 0 | 0 | 0 | 0 | 0 | | 0 | 0 | 0 | 0 | 0 |
| 1 | 0 | 1 | 0 | 0 | 0 | 0 | 1 | | 0 | 0 | 0 | 0 | 1 |
| 1 | 0 | 1 | 0 | 0 | 0 | 1 | 0 | | 0 | 0 | 0 | 1 | 0 |
| 1 | 0 | 1 | 0 | 0 | 0 | 1 | 1 | | 0 | 0 | 0 | 1 | 1 |
| 1 | 0 | 1 | 0 | 0 | 1 | 0 | 0 | | 0 | 0 | 1 | 0 | 0 |
| 1 | 0 | 1 | 0 | 0 | 1 | 0 | 1 | | 0 | 0 | 1 | 0 | 1 |
| 1 | 0 | 1 | 0 | 0 | 1 | 1 | 0 | | 0 | 0 | 1 | 1 | 0 |
| 1 | 0 | 1 | 0 | 0 | 1 | 1 | 1 | | 0 | 0 | 1 | 1 | 1 |
| 1 | 0 | 1 | 0 | 1 | 0 | 0 | 0 | | 0 | 1 | 0 | 0 | 0 |
| 1 | 0 | 1 | 0 | 1 | 0 | 0 | 1 | | 0 | 1 | 0 | 0 | 1 |
| 1 | 0 | 1 | 0 | 1 | 0 | 1 | 0 | | 0 | 1 | 0 | 1 | 0 |
| 1 | 0 | 1 | 0 | 1 | 0 | 1 | 1 | | 0 | 1 | 0 | 1 | 1 |
| 1 | 0 | 1 | 0 | 1 | 1 | 0 | 0 | | 0 | 1 | 1 | 0 | 0 |
| 1 | 0 | 1 | 0 | 1 | 1 | 0 | 1 | | 0 | 1 | 1 | 0 | 1 |
| 1 | 0 | 1 | 0 | 1 | 1 | 1 | 0 | | 0 | 1 | 1 | 1 | 0 |
| 1 | 0 | 1 | 0 | 1 | 1 | 1 | 1 | | 0 | 1 | 1 | 1 | 1 |
| 1 | 0 | 1 | 1 | 0 | 0 | 0 | 0 | | 0 | 0 | 0 | 0 | 0 |
| 1 | 0 | 1 | 1 | 0 | 0 | 0 | 1 | | 1 | 0 | 0 | 0 | 1 |
| 1 | 0 | 1 | 1 | 0 | 0 | 1 | 0 | | 1 | 0 | 0 | 1 | 0 |
| 1 | 0 | 1 | 1 | 0 | 0 | 1 | 1 | | 1 | 0 | 0 | 1 | 1 |
| 1 | 0 | 1 | 1 | 0 | 1 | 0 | 0 | | 1 | 0 | 1 | 0 | 0 |
| 1 | 0 | 1 | 1 | 0 | 1 | 0 | 1 | | 1 | 0 | 1 | 0 | 1 |
| 1 | 0 | 1 | 1 | 0 | 1 | 1 | 0 | | 1 | 0 | 1 | 1 | 0 |
| 1 | 0 | 1 | 1 | 0 | 1 | 1 | 1 | | 1 | 0 | 1 | 1 | 1 |
| 1 | 0 | 1 | 1 | 1 | 0 | 0 | 0 | | 1 | 1 | 0 | 0 | 0 |
| 1 | 0 | 1 | 1 | 1 | 0 | 0 | 1 | | 1 | 1 | 0 | 0 | 1 |
| 1 | 0 | 1 | 1 | 1 | 0 | 1 | 0 | | 1 | 1 | 0 | 1 | 0 |
| 1 | 0 | 1 | 1 | 1 | 0 | 1 | 1 | | 1 | 1 | 0 | 1 | 1 |
| 1 | 0 | 1 | 1 | 1 | 1 | 0 | 0 | | 1 | 1 | 1 | 0 | 0 |
| 1 | 0 | 1 | 1 | 1 | 1 | 0 | 1 | | 1 | 1 | 1 | 0 | 1 |
| 1 | 0 | 1 | 1 | 1 | 1 | 1 | 0 | | 1 | 1 | 1 | 1 | 0 |
| 1 | 0 | 1 | 1 | 1 | 1 | 1 | 1 | | 1 | 1 | 1 | 1 | 1 |

TABLE VII

ASSIGNED SLOPE NUMBER = +1

| ADDRESS | | | | | | | | DATA | | | | | |
|---|---|---|---|---|---|---|---|---|---|---|---|---|---|
| t | t-1 | t-2 | sign | | MAG. | | | sign | | MAG. | | | |
| $A_7$ | $A_6$ | $A_5$ | $A_4$ | $A_3$ | $A_2$ | $A_1$ | $A_0$ | $O_7$ $O_6$ $O_5$ | $O_4$ | $O_3$ | $O_2$ | $O_1$ | $O_0$ |
| 1 | 1 | 0 | 0 | 0 | 0 | 0 | 0 | | 1 | 0 | 0 | 0 | 1 |
| 1 | 1 | 0 | 0 | 0 | 0 | 0 | 1 | | 0 | 0 | 0 | 0 | 0 |
| 1 | 1 | 0 | 0 | 0 | 0 | 1 | 0 | | 0 | 0 | 0 | 0 | 1 |
| 1 | 1 | 0 | 0 | 0 | 0 | 1 | 1 | | 0 | 0 | 0 | 1 | 0 |

TABLE VII-continued

ASSIGNED SLOPE NUMBER = +1

| t | t-1 | t-2 | sign | | MAG. | | | | | sign | | MAG. | | |
|---|---|---|---|---|---|---|---|---|---|---|---|---|---|---|
| $A_7$ | $A_6$ | $A_5$ | $A_4$ | $A_3$ | $A_2$ | $A_1$ | $A_0$ | $O_7$ | $O_6$ | $O_5$ | $O_4$ | $O_3$ | $O_2$ | $O_1$ | $O_0$ |
| 1 | 1 | 0 | 0 | 0 | 1 | 0 | 0 | | | | 0 | 0 | 0 | 1 | 1 |
| 1 | 1 | 0 | 0 | 0 | 1 | 0 | 1 | | | | 0 | 0 | 1 | 0 | 0 |
| 1 | 1 | 0 | 0 | 0 | 1 | 1 | 0 | | | | 0 | 0 | 1 | 0 | 1 |
| 1 | 1 | 0 | 0 | 0 | 1 | 1 | 1 | | | | 0 | 0 | 1 | 1 | 0 |
| 1 | 1 | 0 | 0 | 1 | 0 | 0 | 0 | | | | 0 | 0 | 1 | 1 | 1 |
| 1 | 1 | 0 | 0 | 1 | 0 | 0 | 1 | | | | 0 | 1 | 0 | 0 | 0 |
| 1 | 1 | 0 | 0 | 1 | 0 | 1 | 0 | | | | 0 | 1 | 0 | 0 | 1 |
| 1 | 1 | 0 | 0 | 1 | 0 | 1 | 1 | | | | 0 | 1 | 0 | 1 | 0 |
| 1 | 1 | 0 | 0 | 1 | 1 | 0 | 0 | | | | 0 | 1 | 0 | 1 | 1 |
| 1 | 1 | 0 | 0 | 1 | 1 | 0 | 1 | | | | 0 | 1 | 1 | 0 | 0 |
| 1 | 1 | 0 | 0 | 1 | 1 | 1 | 0 | | | | 0 | 1 | 1 | 0 | 1 |
| 1 | 1 | 0 | 0 | 1 | 1 | 1 | 1 | | | | 0 | 1 | 1 | 1 | 0 |
| 1 | 1 | 0 | 1 | 0 | 0 | 0 | 0 | | | | 1 | 0 | 0 | 0 | 1 |
| 1 | 1 | 0 | 1 | 0 | 0 | 0 | 1 | | | | 1 | 0 | 0 | 1 | 0 |
| 1 | 1 | 0 | 1 | 0 | 0 | 1 | 0 | | | | 1 | 0 | 0 | 1 | 1 |
| 1 | 1 | 0 | 1 | 0 | 0 | 1 | 1 | | | | 1 | 0 | 1 | 0 | 0 |
| 1 | 1 | 0 | 1 | 0 | 1 | 0 | 0 | | | | 1 | 0 | 1 | 0 | 1 |
| 1 | 1 | 0 | 1 | 0 | 1 | 0 | 1 | | | | 1 | 0 | 1 | 1 | 0 |
| 1 | 1 | 0 | 1 | 0 | 1 | 1 | 0 | | | | 1 | 0 | 1 | 1 | 1 |
| 1 | 1 | 0 | 1 | 0 | 1 | 1 | 1 | | | | 1 | 1 | 0 | 0 | 0 |
| 1 | 1 | 0 | 1 | 1 | 0 | 0 | 0 | | | | 1 | 1 | 0 | 0 | 1 |
| 1 | 1 | 0 | 1 | 1 | 0 | 0 | 1 | | | | 1 | 1 | 0 | 1 | 0 |
| 1 | 1 | 0 | 1 | 1 | 0 | 1 | 0 | | | | 1 | 1 | 0 | 1 | 1 |
| 1 | 1 | 0 | 1 | 1 | 0 | 1 | 1 | | | | 1 | 1 | 1 | 0 | 0 |
| 1 | 1 | 0 | 1 | 1 | 1 | 0 | 0 | | | | 1 | 1 | 1 | 0 | 1 |
| 1 | 1 | 0 | 1 | 1 | 1 | 0 | 1 | | | | 1 | 1 | 1 | 1 | 0 |
| 1 | 1 | 0 | 1 | 1 | 1 | 1 | 0 | | | | 1 | 1 | 1 | 1 | 1 |
| 1 | 1 | 0 | 1 | 1 | 1 | 1 | 1 | | | | 1 | 1 | 1 | 1 | 1 |

TABLE VIII

ASSIGNED SLOPE NUMBER = +2

| t | t-1 | t-2 | sign | | MAG. | | | | | sign | | MAG. | | |
|---|---|---|---|---|---|---|---|---|---|---|---|---|---|---|
| $A_7$ | $A_6$ | $A_5$ | $A_4$ | $A_3$ | $A_2$ | $A_1$ | $A_0$ | $O_7$ | $O_6$ | $O_5$ | $O_4$ | $O_3$ | $O_2$ | $O_1$ | $O_0$ |
| 1 | 1 | 1 | 0 | 0 | 0 | 0 | 0 | | | | 1 | 0 | 0 | 1 | 0 |
| 1 | 1 | 1 | 0 | 0 | 0 | 0 | 1 | | | | 1 | 0 | 0 | 0 | 1 |
| 1 | 1 | 1 | 0 | 0 | 0 | 1 | 0 | | | | 0 | 0 | 0 | 0 | 0 |
| 1 | 1 | 1 | 0 | 0 | 0 | 1 | 1 | | | | 0 | 0 | 0 | 0 | 1 |
| 1 | 1 | 1 | 0 | 0 | 1 | 0 | 0 | | | | 0 | 0 | 0 | 1 | 0 |
| 1 | 1 | 1 | 0 | 0 | 1 | 0 | 1 | | | | 0 | 0 | 0 | 1 | 1 |
| 1 | 1 | 1 | 0 | 0 | 1 | 1 | 0 | | | | 0 | 0 | 1 | 0 | 0 |
| 1 | 1 | 1 | 0 | 0 | 1 | 1 | 1 | | | | 0 | 0 | 1 | 0 | 1 |
| 1 | 1 | 1 | 0 | 1 | 0 | 0 | 0 | | | | 0 | 0 | 1 | 1 | 0 |
| 1 | 1 | 1 | 0 | 1 | 0 | 0 | 1 | | | | 0 | 0 | 1 | 1 | 1 |
| 1 | 1 | 1 | 0 | 1 | 0 | 1 | 0 | | | | 0 | 1 | 0 | 0 | 0 |
| 1 | 1 | 1 | 0 | 1 | 0 | 1 | 1 | | | | 0 | 1 | 0 | 0 | 1 |
| 1 | 1 | 1 | 0 | 1 | 1 | 0 | 0 | | | | 0 | 1 | 0 | 1 | 0 |
| 1 | 1 | 1 | 0 | 1 | 1 | 0 | 1 | | | | 0 | 1 | 0 | 1 | 1 |
| 1 | 1 | 1 | 0 | 1 | 1 | 1 | 0 | | | | 0 | 1 | 1 | 0 | 0 |
| 1 | 1 | 1 | 0 | 1 | 1 | 1 | 1 | | | | 0 | 1 | 1 | 0 | 1 |
| 1 | 1 | 1 | 1 | 0 | 0 | 0 | 0 | | | | 1 | 0 | 0 | 1 | 0 |
| 1 | 1 | 1 | 1 | 0 | 0 | 0 | 1 | 1 | | | 1 | 0 | 0 | 1 | 1 |
| 1 | 1 | 1 | 1 | 0 | 0 | 1 | 0 | | | | 1 | 0 | 1 | 0 | 0 |
| 1 | 1 | 1 | 1 | 0 | 0 | 1 | 1 | | | | 1 | 0 | 1 | 0 | 1 |
| 1 | 1 | 1 | 1 | 0 | 1 | 0 | 0 | | | | 1 | 0 | 1 | 1 | 0 |
| 1 | 1 | 1 | 1 | 0 | 1 | 0 | 1 | | | | 1 | 0 | 1 | 1 | 1 |
| 1 | 1 | 1 | 1 | 0 | 1 | 1 | 0 | | | | 1 | 1 | 0 | 0 | 0 |
| 1 | 1 | 1 | 1 | 0 | 1 | 1 | 1 | | | | 1 | 1 | 0 | 0 | 1 |
| 1 | 1 | 1 | 1 | 1 | 0 | 0 | 0 | | | | 1 | 1 | 0 | 1 | 0 |
| 1 | 1 | 1 | 1 | 1 | 0 | 0 | 1 | | | | 1 | 1 | 0 | 1 | 1 |
| 1 | 1 | 1 | 1 | 1 | 0 | 1 | 0 | | | | 1 | 1 | 1 | 0 | 0 |
| 1 | 1 | 1 | 1 | 1 | 0 | 1 | 1 | | | | 1 | 1 | 1 | 0 | 1 |
| 1 | 1 | 1 | 1 | 1 | 1 | 0 | 0 | | | | 1 | 1 | 1 | 1 | 0 |
| 1 | 1 | 1 | 1 | 1 | 1 | 0 | 1 | | | | 1 | 1 | 1 | 1 | 1 |
| 1 | 1 | 1 | 1 | 1 | 1 | 1 | 0 | | | | 1 | 1 | 1 | 1 | 1 |
| 1 | 1 | 1 | 1 | 1 | 1 | 1 | 1 | | | | 1 | 1 | 1 | 1 | 1 |

TABLE IX

ASSIGNED SLOPE NUMBER = −2

| ADDRESS | | | | | | | | DATA | | | | | | | |
|---|---|---|---|---|---|---|---|---|---|---|---|---|---|---|---|
| t | t-1 | t-2 | sign | \multicolumn{4}{c}{MAG.} | J | K | | sign | \multicolumn{4}{c}{MAG.} |
| $A_7$ | $A_6$ | $A_5$ | $A_4$ | $A_3$ | $A_2$ | $A_1$ | $A_0$ | $O_7$ | $O_6$ | $O_5$ | $O_4$ | $O_3$ | $O_2$ | $O_1$ | $O_0$ |
| 0 | 0 | 0 | 0 | 0 | 0 | 0 | 0 | 1 | 0 | 0 | 1 | 0 | 0 | 1 | 0 |
| 0 | 0 | 0 | 0 | 0 | 0 | 0 | 1 | 1 | 0 | 0 | 1 | 0 | 0 | 0 | 1 |
| 0 | 0 | 0 | 0 | 0 | 0 | 1 | 0 | 1 | 1 | 0 | 0 | 0 | 0 | 0 | 0 |
| 0 | 0 | 0 | 0 | 0 | 0 | 1 | 1 | 0 | 1 | 0 | 0 | 0 | 0 | 0 | 1 |
| 0 | 0 | 0 | 0 | 0 | 1 | 0 | 0 | 0 | 1 | 0 | 0 | 0 | 0 | 1 | 0 |
| 0 | 0 | 0 | 0 | 0 | 1 | 0 | 1 | 0 | 1 | 0 | 0 | 0 | 0 | 1 | 1 |
| 0 | 0 | 0 | 0 | 0 | 1 | 1 | 0 | 0 | 1 | 0 | 0 | 0 | 1 | 0 | 0 |
| 0 | 0 | 0 | 0 | 0 | 1 | 1 | 1 | 0 | 1 | 0 | 0 | 0 | 1 | 0 | 1 |
| 0 | 0 | 0 | 0 | 1 | 0 | 0 | 0 | 0 | 1 | 0 | 0 | 0 | 1 | 1 | 0 |
| 0 | 0 | 0 | 0 | 1 | 0 | 0 | 1 | 0 | 1 | 0 | 0 | 0 | 1 | 1 | 1 |
| 0 | 0 | 0 | 0 | 1 | 0 | 1 | 0 | 0 | 1 | 0 | 0 | 1 | 0 | 0 | 0 |
| 0 | 0 | 0 | 0 | 1 | 0 | 1 | 1 | 0 | 1 | 0 | 0 | 1 | 0 | 0 | 1 |
| 0 | 0 | 0 | 0 | 1 | 1 | 0 | 0 | 0 | 1 | 0 | 0 | 1 | 0 | 1 | 0 |
| 0 | 0 | 0 | 0 | 1 | 1 | 0 | 1 | 0 | 1 | 0 | 0 | 1 | 0 | 1 | 1 |
| 0 | 0 | 0 | 0 | 1 | 1 | 1 | 0 | 0 | 1 | 0 | 0 | 1 | 1 | 0 | 0 |
| 0 | 0 | 0 | 0 | 1 | 1 | 1 | 1 | 0 | 1 | 0 | 0 | 1 | 1 | 0 | 1 |
| 0 | 0 | 0 | 1 | 0 | 0 | 0 | 0 | 1 | 0 | 0 | 1 | 0 | 0 | 1 | 0 |
| 0 | 0 | 0 | 1 | 0 | 0 | 0 | 1 | 1 | 0 | 0 | 1 | 0 | 0 | 1 | 1 |
| 0 | 0 | 0 | 1 | 0 | 0 | 1 | 0 | 1 | 0 | 0 | 1 | 0 | 1 | 0 | 0 |
| 0 | 0 | 0 | 1 | 0 | 0 | 1 | 1 | 1 | 0 | 0 | 1 | 0 | 1 | 0 | 1 |
| 0 | 0 | 0 | 1 | 0 | 1 | 0 | 0 | 1 | 0 | 0 | 1 | 0 | 1 | 1 | 0 |
| 0 | 0 | 0 | 1 | 0 | 1 | 0 | 1 | 1 | 0 | 0 | 1 | 0 | 1 | 1 | 1 |
| 0 | 0 | 0 | 1 | 0 | 1 | 1 | 0 | 1 | 0 | 0 | 1 | 1 | 0 | 0 | 0 |
| 0 | 0 | 0 | 1 | 0 | 1 | 1 | 1 | 1 | 0 | 0 | 1 | 1 | 0 | 0 | 1 |
| 0 | 0 | 0 | 1 | 1 | 0 | 0 | 0 | 1 | 0 | 0 | 1 | 1 | 0 | 1 | 0 |
| 0 | 0 | 0 | 1 | 1 | 0 | 0 | 1 | 1 | 0 | 0 | 1 | 1 | 0 | 1 | 1 |
| 0 | 0 | 0 | 1 | 1 | 0 | 1 | 0 | 1 | 0 | 0 | 1 | 1 | 1 | 0 | 0 |
| 0 | 0 | 0 | 1 | 1 | 0 | 1 | 1 | 1 | 0 | 0 | 1 | 1 | 1 | 0 | 1 |
| 0 | 0 | 0 | 1 | 1 | 1 | 0 | 0 | 1 | 0 | 0 | 1 | 1 | 1 | 1 | 0 |
| 0 | 0 | 0 | 1 | 1 | 1 | 0 | 1 | 1 | 0 | 0 | 1 | 1 | 1 | 1 | 1 |
| 0 | 0 | 0 | 1 | 1 | 1 | 1 | 0 | 1 | 0 | 0 | 1 | 1 | 1 | 1 | 1 |
| 0 | 0 | 0 | 1 | 1 | 1 | 1 | 1 | 1 | 0 | 0 | 1 | 1 | 1 | 1 | 1 |

TABLE X

ASSIGNED SLOPE NUMBER = −1

| ADDRESS | | | | | | | | DATA | | | | | | | |
|---|---|---|---|---|---|---|---|---|---|---|---|---|---|---|---|
| t | t-1 | t-2 | sign | \multicolumn{4}{c}{MAG.} | J | K | | sign | \multicolumn{4}{c}{MAG.} |
| $A_7$ | $A_6$ | $A_5$ | $A_4$ | $A_3$ | $A_2$ | $A_1$ | $A_0$ | $O_7$ | $O_6$ | $O_5$ | $O_4$ | $O_3$ | $O_2$ | $O_1$ | $O_0$ |
| 0 | 0 | 1 | 0 | 0 | 0 | 0 | 0 | 1 | 0 | 0 | 1 | 0 | 0 | 0 | 1 |
| 0 | 0 | 1 | 0 | 0 | 0 | 0 | 1 | 1 | 1 | 0 | 0 | 0 | 0 | 0 | 0 |
| 0 | 0 | 1 | 0 | 0 | 0 | 1 | 0 | 0 | 1 | 0 | 0 | 0 | 0 | 0 | 1 |
| 0 | 0 | 1 | 0 | 0 | 0 | 1 | 1 | 0 | 1 | 0 | 0 | 0 | 0 | 1 | 0 |
| 0 | 0 | 1 | 0 | 0 | 1 | 0 | 0 | 0 | 1 | 0 | 0 | 0 | 0 | 1 | 1 |
| 0 | 0 | 1 | 0 | 0 | 1 | 0 | 1 | 0 | 1 | 0 | 0 | 0 | 1 | 0 | 0 |
| 0 | 0 | 1 | 0 | 0 | 1 | 1 | 0 | 0 | 1 | 0 | 0 | 0 | 1 | 0 | 1 |
| 0 | 0 | 1 | 0 | 0 | 1 | 1 | 1 | 0 | 1 | 0 | 0 | 0 | 1 | 1 | 0 |
| 0 | 0 | 1 | 0 | 1 | 0 | 0 | 0 | 0 | 1 | 0 | 0 | 0 | 1 | 1 | 1 |
| 0 | 0 | 1 | 0 | 1 | 0 | 0 | 1 | 0 | 1 | 0 | 0 | 1 | 0 | 0 | 0 |
| 0 | 0 | 1 | 0 | 1 | 0 | 1 | 0 | 0 | 1 | 0 | 0 | 1 | 0 | 0 | 1 |
| 0 | 0 | 1 | 0 | 1 | 0 | 1 | 1 | 0 | 1 | 0 | 0 | 1 | 0 | 1 | 0 |
| 0 | 0 | 1 | 0 | 1 | 1 | 0 | 0 | 0 | 1 | 0 | 0 | 1 | 0 | 1 | 1 |
| 0 | 0 | 1 | 0 | 1 | 1 | 0 | 1 | 0 | 1 | 0 | 0 | 1 | 1 | 0 | 0 |
| 0 | 0 | 1 | 0 | 1 | 1 | 1 | 0 | 0 | 1 | 0 | 0 | 1 | 1 | 0 | 1 |
| 0 | 0 | 1 | 0 | 1 | 1 | 1 | 1 | 0 | 1 | 0 | 0 | 1 | 1 | 1 | 0 |
| 0 | 0 | 1 | 1 | 0 | 0 | 0 | 0 | 1 | 0 | 0 | 1 | 0 | 0 | 0 | 1 |
| 0 | 0 | 1 | 1 | 0 | 0 | 0 | 1 | 1 | 0 | 0 | 1 | 0 | 0 | 1 | 0 |
| 0 | 0 | 1 | 1 | 0 | 0 | 1 | 0 | 1 | 0 | 0 | 1 | 0 | 0 | 1 | 1 |
| 0 | 0 | 1 | 1 | 0 | 0 | 1 | 1 | 1 | 0 | 0 | 1 | 0 | 1 | 0 | 0 |
| 0 | 0 | 1 | 1 | 0 | 1 | 0 | 0 | 1 | 0 | 0 | 1 | 0 | 1 | 0 | 1 |
| 0 | 0 | 1 | 1 | 0 | 1 | 0 | 1 | 1 | 0 | 0 | 1 | 0 | 1 | 1 | 0 |
| 0 | 0 | 1 | 1 | 0 | 1 | 1 | 0 | 1 | 0 | 0 | 1 | 0 | 1 | 1 | 1 |
| 0 | 0 | 1 | 1 | 0 | 1 | 1 | 1 | 1 | 0 | 0 | 1 | 1 | 0 | 0 | 0 |
| 0 | 0 | 1 | 1 | 1 | 0 | 0 | 0 | 1 | 0 | 0 | 1 | 1 | 0 | 0 | 1 |
| 0 | 0 | 1 | 1 | 1 | 0 | 0 | 1 | 1 | 0 | 0 | 1 | 1 | 0 | 1 | 0 |
| 0 | 0 | 1 | 1 | 1 | 0 | 1 | 0 | 1 | 0 | 0 | 1 | 1 | 0 | 1 | 1 |
| 0 | 0 | 1 | 1 | 1 | 0 | 1 | 1 | 1 | 0 | 0 | 1 | 1 | 1 | 0 | 0 |
| 0 | 0 | 1 | 1 | 1 | 1 | 0 | 0 | 1 | 0 | 0 | 1 | 1 | 1 | 0 | 1 |
| 0 | 0 | 1 | 1 | 1 | 1 | 0 | 1 | 1 | 0 | 0 | 1 | 1 | 1 | 1 | 0 |
| 0 | 0 | 1 | 1 | 1 | 1 | 1 | 0 | 1 | 0 | 0 | 1 | 1 | 1 | 1 | 1 |
| 0 | 0 | 1 | 1 | 1 | 1 | 1 | 1 | 1 | 0 | 0 | 1 | 1 | 1 | 1 | 1 |

TABLE XI

ASSIGNED SLOPE NUMBER = 0

| ADDRESS | | | | | | | | DATA | | | | | | | |
|---|---|---|---|---|---|---|---|---|---|---|---|---|---|---|---|
| t | t-1 | t-2 | sing | MAG. | | | | J | K | sign | MAG. | | | | |
| $A_7$ | $A_6$ | $A_5$ | $A_4$ | $A_3$ | $A_2$ | $A_1$ | $A_0$ | $O_7$ | $O_6$ | $O_5$ | $O_4$ | $O_3$ | $O_2$ | $O_1$ | $O_0$ |
| 0 | 1 | 0 | 0 | 0 | 0 | 0 | 0 | 1 | 1 | 0 | 0 | 0 | 0 | 0 | 0 |
| 0 | 1 | 0 | 0 | 0 | 0 | 0 | 1 | 0 | 1 | 0 | 0 | 0 | 0 | 0 | 1 |
| 0 | 1 | 0 | 0 | 0 | 0 | 1 | 0 | 0 | 1 | 0 | 0 | 0 | 0 | 1 | 0 |
| 0 | 1 | 0 | 0 | 0 | 0 | 1 | 1 | 0 | 1 | 0 | 0 | 0 | 0 | 1 | 1 |
| 0 | 1 | 0 | 0 | 0 | 1 | 0 | 0 | 0 | 1 | 0 | 0 | 0 | 1 | 0 | 0 |
| 0 | 1 | 0 | 0 | 0 | 1 | 0 | 1 | 0 | 1 | 0 | 0 | 0 | 1 | 0 | 1 |
| 0 | 1 | 0 | 0 | 0 | 1 | 1 | 0 | 0 | 1 | 0 | 0 | 0 | 1 | 1 | 0 |
| 0 | 1 | 0 | 0 | 0 | 1 | 1 | 1 | 0 | 1 | 0 | 0 | 0 | 1 | 1 | 1 |
| 0 | 1 | 0 | 0 | 1 | 0 | 0 | 0 | 0 | 1 | 0 | 0 | 1 | 0 | 0 | 0 |
| 0 | 1 | 0 | 0 | 1 | 0 | 0 | 1 | 0 | 1 | 0 | 0 | 1 | 0 | 0 | 1 |
| 0 | 1 | 0 | 0 | 1 | 0 | 1 | 0 | 0 | 1 | 0 | 0 | 1 | 0 | 1 | 0 |
| 0 | 1 | 0 | 0 | 1 | 0 | 1 | 1 | 0 | 1 | 0 | 0 | 1 | 0 | 1 | 1 |
| 0 | 1 | 0 | 0 | 1 | 1 | 0 | 0 | 0 | 1 | 0 | 0 | 1 | 1 | 0 | 0 |
| 0 | 1 | 0 | 0 | 1 | 1 | 0 | 1 | 0 | 1 | 0 | 0 | 1 | 1 | 0 | 1 |
| 0 | 1 | 0 | 0 | 1 | 1 | 1 | 0 | 0 | 1 | 0 | 0 | 1 | 1 | 1 | 0 |
| 0 | 1 | 0 | 0 | 1 | 1 | 1 | 1 | 0 | 1 | 0 | 0 | 1 | 1 | 1 | 1 |
| 0 | 1 | 0 | 1 | 0 | 0 | 0 | 0 | 1 | 1 | 0 | 0 | 0 | 0 | 0 | 0 |
| 0 | 1 | 0 | 1 | 0 | 0 | 0 | 1 | 1 | 0 | 0 | 1 | 0 | 0 | 0 | 1 |
| 0 | 1 | 0 | 1 | 0 | 0 | 1 | 0 | 1 | 0 | 0 | 1 | 0 | 0 | 1 | 0 |
| 0 | 1 | 0 | 1 | 0 | 0 | 1 | 1 | 1 | 0 | 0 | 1 | 0 | 0 | 1 | 1 |
| 0 | 1 | 0 | 1 | 0 | 1 | 0 | 0 | 1 | 0 | 0 | 1 | 0 | 1 | 0 | 0 |
| 0 | 1 | 0 | 1 | 0 | 1 | 0 | 1 | 1 | 0 | 0 | 1 | 0 | 1 | 0 | 1 |
| 0 | 1 | 0 | 1 | 0 | 1 | 1 | 0 | 1 | 0 | 0 | 1 | 0 | 1 | 1 | 0 |
| 0 | 1 | 0 | 1 | 0 | 1 | 1 | 1 | 1 | 0 | 0 | 1 | 0 | 1 | 1 | 1 |
| 0 | 1 | 0 | 1 | 1 | 0 | 0 | 0 | 1 | 0 | 0 | 1 | 1 | 0 | 0 | 0 |
| 0 | 1 | 0 | 1 | 1 | 0 | 0 | 1 | 1 | 0 | 0 | 1 | 1 | 0 | 0 | 1 |
| 0 | 1 | 0 | 1 | 1 | 0 | 1 | 0 | 1 | 0 | 0 | 1 | 1 | 0 | 1 | 0 |
| 0 | 1 | 0 | 1 | 1 | 0 | 1 | 1 | 1 | 0 | 0 | 1 | 1 | 0 | 1 | 1 |
| 0 | 1 | 0 | 1 | 1 | 1 | 0 | 0 | 1 | 0 | 0 | 1 | 1 | 1 | 0 | 0 |
| 0 | 1 | 0 | 1 | 1 | 1 | 0 | 1 | 1 | 0 | 0 | 1 | 1 | 1 | 0 | 1 |
| 0 | 1 | 0 | 1 | 1 | 1 | 1 | 0 | 1 | 0 | 0 | 1 | 1 | 1 | 1 | 0 |
| 0 | 1 | 0 | 1 | 1 | 1 | 1 | 1 | 1 | 0 | 0 | 1 | 1 | 1 | 1 | 1 |

TABLE XII

ASSIGNED SLOPE NUMBER = 0

| ADDRESS | | | | | | | | DATA | | | | | | | |
|---|---|---|---|---|---|---|---|---|---|---|---|---|---|---|---|
| t | t-1 | t-2 | sign | MAG. | | | | J | K | sign | MAG. | | | | |
| $A_7$ | $A_6$ | $A_5$ | $A_4$ | $A_3$ | $A_2$ | $A_1$ | $A_0$ | $O_7$ | $O_6$ | $O_5$ | $O_4$ | $O_3$ | $O_2$ | $O_1$ | $O_0$ |
| 0 | 1 | 1 | 0 | 0 | 0 | 0 | 0 | 1 | 1 | 0 | 0 | 0 | 0 | 0 | 0 |
| 0 | 1 | 1 | 0 | 0 | 0 | 0 | 1 | 0 | 1 | 0 | 0 | 0 | 0 | 0 | 1 |
| 0 | 1 | 1 | 0 | 0 | 0 | 1 | 0 | 0 | 1 | 0 | 0 | 0 | 0 | 1 | 0 |
| 0 | 1 | 1 | 0 | 0 | 0 | 1 | 1 | 0 | 1 | 0 | 0 | 0 | 0 | 1 | 1 |
| 0 | 1 | 1 | 0 | 0 | 1 | 0 | 0 | 0 | 1 | 0 | 0 | 0 | 1 | 0 | 0 |
| 0 | 1 | 1 | 0 | 0 | 1 | 0 | 1 | 0 | 1 | 0 | 0 | 0 | 1 | 0 | 1 |
| 0 | 1 | 1 | 0 | 0 | 1 | 1 | 0 | 0 | 1 | 0 | 0 | 0 | 1 | 1 | 0 |
| 0 | 1 | 1 | 0 | 0 | 1 | 1 | 1 | 0 | 1 | 0 | 0 | 0 | 1 | 1 | 1 |
| 0 | 1 | 1 | 0 | 1 | 0 | 0 | 0 | 0 | 1 | 0 | 0 | 1 | 0 | 0 | 0 |
| 0 | 1 | 1 | 0 | 1 | 0 | 0 | 1 | 0 | 1 | 0 | 0 | 1 | 0 | 0 | 1 |
| 0 | 1 | 1 | 0 | 1 | 0 | 1 | 0 | 0 | 1 | 0 | 0 | 1 | 0 | 1 | 0 |
| 0 | 1 | 1 | 0 | 1 | 0 | 1 | 1 | 0 | 1 | 0 | 0 | 1 | 0 | 1 | 1 |
| 0 | 1 | 1 | 0 | 1 | 1 | 0 | 0 | 0 | 1 | 0 | 0 | 1 | 1 | 0 | 0 |
| 0 | 1 | 1 | 0 | 1 | 1 | 0 | 1 | 0 | 1 | 0 | 0 | 1 | 1 | 0 | 1 |
| 0 | 1 | 1 | 0 | 1 | 1 | 1 | 0 | 0 | 1 | 0 | 0 | 1 | 1 | 1 | 0 |
| 0 | 1 | 1 | 0 | 1 | 1 | 1 | 1 | 0 | 1 | 0 | 0 | 1 | 1 | 1 | 1 |
| 0 | 1 | 1 | 1 | 0 | 0 | 0 | 0 | 1 | 1 | 0 | 0 | 0 | 0 | 0 | 0 |
| 0 | 1 | 1 | 1 | 0 | 0 | 0 | 1 | 1 | 0 | 0 | 1 | 0 | 0 | 0 | 1 |
| 0 | 1 | 1 | 1 | 0 | 0 | 1 | 0 | 1 | 0 | 0 | 1 | 0 | 0 | 1 | 0 |
| 0 | 1 | 1 | 1 | 0 | 0 | 1 | 1 | 1 | 0 | 0 | 1 | 0 | 0 | 1 | 1 |
| 0 | 1 | 1 | 1 | 0 | 1 | 0 | 0 | 1 | 0 | 0 | 1 | 0 | 1 | 0 | 0 |
| 0 | 1 | 1 | 1 | 0 | 1 | 0 | 1 | 1 | 0 | 0 | 1 | 0 | 1 | 0 | 1 |
| 0 | 1 | 1 | 1 | 0 | 1 | 1 | 0 | 1 | 0 | 0 | 1 | 0 | 1 | 1 | 0 |
| 0 | 1 | 1 | 1 | 0 | 1 | 1 | 1 | 1 | 0 | 0 | 1 | 0 | 1 | 1 | 1 |
| 0 | 1 | 1 | 1 | 1 | 0 | 0 | 0 | 1 | 0 | 0 | 1 | 1 | 0 | 0 | 0 |
| 0 | 1 | 1 | 1 | 1 | 0 | 0 | 1 | 1 | 0 | 0 | 1 | 1 | 0 | 0 | 1 |
| 0 | 1 | 1 | 1 | 1 | 0 | 1 | 0 | 1 | 0 | 0 | 1 | 1 | 0 | 1 | 0 |
| 0 | 1 | 1 | 1 | 1 | 0 | 1 | 1 | 1 | 0 | 0 | 1 | 1 | 0 | 1 | 1 |
| 0 | 1 | 1 | 1 | 1 | 1 | 0 | 0 | 1 | 0 | 0 | 1 | 1 | 1 | 0 | 0 |
| 0 | 1 | 1 | 1 | 1 | 1 | 0 | 1 | 1 | 0 | 0 | 1 | 1 | 1 | 0 | 1 |
| 0 | 1 | 1 | 1 | 1 | 1 | 1 | 0 | 1 | 0 | 0 | 1 | 1 | 1 | 1 | 0 |
| 0 | 1 | 1 | 1 | 1 | 1 | 1 | 1 | 1 | 0 | 0 | 1 | 1 | 1 | 1 | 1 |

TABLE XIII

ASSIGNED SLOPE NUMBER = 0

| ADDRESS | | | | | | | | DATA | | | | | | | |
|---|---|---|---|---|---|---|---|---|---|---|---|---|---|---|---|
| t | t-1 | t-2 | sign | MAG. | | | | J | K | | sign | MAG. | | | |
| A7 | A6 | A5 | A4 | A3 | A2 | A1 | A0 | O7 | O6 | O5 | O4 | O3 | O2 | O1 | O0 |
| 1 | 0 | 0 | 0 | 0 | 0 | 0 | 0 | 1 | 1 | 0 | 0 | 0 | 0 | 0 | 0 |
| 1 | 0 | 0 | 0 | 0 | 0 | 0 | 1 | 0 | 1 | 0 | 0 | 0 | 0 | 0 | 1 |
| 1 | 0 | 0 | 0 | 0 | 0 | 1 | 0 | 0 | 1 | 0 | 0 | 0 | 0 | 1 | 0 |
| 1 | 0 | 0 | 0 | 0 | 0 | 1 | 1 | 0 | 1 | 0 | 0 | 0 | 0 | 1 | 1 |
| 1 | 0 | 0 | 0 | 0 | 1 | 0 | 0 | 0 | 1 | 0 | 0 | 0 | 1 | 0 | 0 |
| 1 | 0 | 0 | 0 | 0 | 1 | 0 | 1 | 0 | 1 | 0 | 0 | 0 | 1 | 0 | 1 |
| 1 | 0 | 0 | 0 | 0 | 1 | 1 | 0 | 0 | 1 | 0 | 0 | 0 | 1 | 1 | 0 |
| 1 | 0 | 0 | 0 | 0 | 1 | 1 | 1 | 0 | 1 | 0 | 0 | 0 | 1 | 1 | 1 |
| 1 | 0 | 0 | 0 | 1 | 0 | 0 | 0 | 0 | 1 | 0 | 0 | 1 | 0 | 0 | 0 |
| 1 | 0 | 0 | 0 | 1 | 0 | 0 | 1 | 0 | 1 | 0 | 0 | 1 | 0 | 0 | 1 |
| 1 | 0 | 0 | 0 | 1 | 0 | 1 | 0 | 0 | 1 | 0 | 0 | 1 | 0 | 1 | 0 |
| 1 | 0 | 0 | 0 | 1 | 0 | 1 | 1 | 0 | 1 | 0 | 0 | 1 | 0 | 1 | 1 |
| 1 | 0 | 0 | 0 | 1 | 1 | 0 | 0 | 0 | 1 | 0 | 0 | 1 | 1 | 0 | 0 |
| 1 | 0 | 0 | 0 | 1 | 1 | 0 | 1 | 0 | 1 | 0 | 0 | 1 | 1 | 0 | 1 |
| 1 | 0 | 0 | 0 | 1 | 1 | 1 | 0 | 0 | 1 | 0 | 0 | 1 | 1 | 1 | 0 |
| 1 | 0 | 0 | 0 | 1 | 1 | 1 | 1 | 0 | 1 | 0 | 0 | 1 | 1 | 1 | 1 |
| 1 | 0 | 0 | 1 | 0 | 0 | 0 | 0 | 1 | 1 | 0 | 0 | 0 | 0 | 0 | 0 |
| 1 | 0 | 0 | 1 | 0 | 0 | 0 | 1 | 1 | 0 | 0 | 1 | 0 | 0 | 0 | 1 |
| 1 | 0 | 0 | 1 | 0 | 0 | 1 | 0 | 1 | 0 | 0 | 1 | 0 | 0 | 1 | 0 |
| 1 | 0 | 0 | 1 | 0 | 0 | 1 | 1 | 1 | 0 | 0 | 1 | 0 | 0 | 1 | 1 |
| 1 | 0 | 0 | 1 | 0 | 1 | 0 | 0 | 1 | 0 | 0 | 1 | 0 | 1 | 0 | 0 |
| 1 | 0 | 0 | 1 | 0 | 1 | 0 | 1 | 1 | 0 | 0 | 1 | 0 | 1 | 0 | 1 |
| 1 | 0 | 0 | 1 | 0 | 1 | 1 | 0 | 1 | 0 | 0 | 1 | 0 | 1 | 1 | 0 |
| 1 | 0 | 0 | 1 | 0 | 1 | 1 | 1 | 1 | 0 | 0 | 1 | 0 | 1 | 1 | 1 |
| 1 | 0 | 0 | 1 | 1 | 0 | 0 | 0 | 1 | 0 | 0 | 1 | 1 | 0 | 0 | 0 |
| 1 | 0 | 0 | 1 | 1 | 0 | 0 | 1 | 1 | 0 | 0 | 1 | 1 | 0 | 0 | 1 |
| 1 | 0 | 0 | 1 | 1 | 0 | 1 | 0 | 1 | 0 | 0 | 1 | 1 | 0 | 1 | 0 |
| 1 | 0 | 0 | 1 | 1 | 0 | 1 | 1 | 1 | 0 | 0 | 1 | 1 | 0 | 1 | 1 |
| 1 | 0 | 0 | 1 | 1 | 1 | 0 | 0 | 1 | 0 | 0 | 1 | 1 | 1 | 0 | 0 |
| 1 | 0 | 0 | 1 | 1 | 1 | 0 | 1 | 1 | 0 | 0 | 1 | 1 | 1 | 0 | 1 |
| 1 | 0 | 0 | 1 | 1 | 1 | 1 | 0 | 1 | 0 | 0 | 1 | 1 | 1 | 1 | 0 |
| 1 | 0 | 0 | 1 | 1 | 1 | 1 | 1 | 1 | 0 | 0 | 1 | 1 | 1 | 1 | 1 |

TABLE XIV

ASSIGNED SLOPE NUMBER = 0

| ADDRESS | | | | | | | | DATA | | | | | | | |
|---|---|---|---|---|---|---|---|---|---|---|---|---|---|---|---|
| t | t-1 | t-2 | sign | MAG. | | | | J | K | | sign | MAG. | | | |
| A7 | A6 | A5 | A4 | A3 | A2 | A1 | A0 | O7 | O6 | O5 | O4 | O3 | O2 | O1 | O |
| 1 | 0 | 1 | 0 | 0 | 0 | 0 | 0 | 1 | 1 | 0 | 0 | 0 | 0 | 0 | 0 |
| 1 | 0 | 1 | 0 | 0 | 0 | 0 | 1 | 0 | 1 | 0 | 0 | 0 | 0 | 0 | 1 |
| 1 | 0 | 1 | 0 | 0 | 0 | 1 | 0 | 0 | 1 | 0 | 0 | 0 | 0 | 1 | 0 |
| 1 | 0 | 1 | 0 | 0 | 0 | 1 | 1 | 0 | 1 | 0 | 0 | 0 | 0 | 1 | 1 |
| 1 | 0 | 1 | 0 | 0 | 1 | 0 | 0 | 0 | 1 | 0 | 0 | 0 | 1 | 0 | 0 |
| 1 | 0 | 1 | 0 | 0 | 1 | 0 | 1 | 0 | 1 | 0 | 0 | 0 | 1 | 0 | 1 |
| 1 | 0 | 1 | 0 | 0 | 1 | 1 | 0 | 0 | 1 | 0 | 0 | 0 | 1 | 1 | 0 |
| 1 | 0 | 1 | 0 | 0 | 1 | 1 | 1 | 0 | 1 | 0 | 0 | 0 | 1 | 1 | 1 |
| 1 | 0 | 1 | 0 | 1 | 0 | 0 | 0 | 0 | 1 | 0 | 0 | 1 | 0 | 0 | 0 |
| 1 | 0 | 1 | 0 | 1 | 0 | 0 | 1 | 0 | 1 | 0 | 0 | 1 | 0 | 0 | 1 |
| 1 | 0 | 1 | 0 | 1 | 0 | 1 | 0 | 0 | 1 | 0 | 0 | 1 | 0 | 1 | 0 |
| 1 | 0 | 1 | 0 | 1 | 0 | 1 | 1 | 0 | 1 | 0 | 0 | 1 | 0 | 1 | 1 |
| 1 | 0 | 1 | 0 | 1 | 1 | 0 | 0 | 0 | 1 | 0 | 0 | 1 | 1 | 0 | 0 |
| 1 | 0 | 1 | 0 | 1 | 1 | 0 | 1 | 0 | 1 | 0 | 0 | 1 | 1 | 0 | 1 |
| 1 | 0 | 1 | 0 | 1 | 1 | 1 | 0 | 0 | 1 | 0 | 0 | 1 | 1 | 1 | 0 |
| 1 | 0 | 1 | 0 | 1 | 1 | 1 | 1 | 0 | 1 | 0 | 0 | 1 | 1 | 1 | 1 |
| 1 | 0 | 1 | 1 | 0 | 0 | 0 | 0 | 1 | 1 | 0 | 0 | 0 | 0 | 0 | 0 |
| 1 | 0 | 1 | 1 | 0 | 0 | 0 | 1 | 1 | 0 | 0 | 1 | 0 | 0 | 0 | 1 |
| 1 | 0 | 1 | 1 | 0 | 0 | 1 | 0 | 1 | 0 | 0 | 1 | 0 | 0 | 1 | 0 |
| 1 | 0 | 1 | 1 | 0 | 0 | 1 | 1 | 1 | 0 | 0 | 1 | 0 | 0 | 1 | 1 |
| 1 | 0 | 1 | 1 | 0 | 1 | 0 | 0 | 1 | 0 | 0 | 1 | 0 | 1 | 0 | 0 |
| 1 | 0 | 1 | 1 | 0 | 1 | 0 | 1 | 1 | 0 | 0 | 1 | 0 | 1 | 0 | 1 |
| 1 | 0 | 1 | 1 | 0 | 1 | 1 | 0 | 1 | 0 | 0 | 1 | 0 | 1 | 1 | 0 |
| 1 | 0 | 1 | 1 | 0 | 1 | 1 | 1 | 1 | 0 | 0 | 1 | 0 | 1 | 1 | 1 |
| 1 | 0 | 1 | 1 | 1 | 0 | 0 | 0 | 1 | 0 | 0 | 1 | 1 | 0 | 0 | 0 |
| 1 | 0 | 1 | 1 | 1 | 0 | 0 | 1 | 1 | 0 | 0 | 1 | 1 | 0 | 0 | 1 |
| 1 | 0 | 1 | 1 | 1 | 0 | 1 | 0 | 1 | 0 | 0 | 1 | 1 | 0 | 1 | 0 |
| 1 | 0 | 1 | 1 | 1 | 0 | 1 | 1 | 1 | 0 | 0 | 1 | 1 | 0 | 1 | 1 |
| 1 | 0 | 1 | 1 | 1 | 1 | 0 | 0 | 1 | 0 | 0 | 1 | 1 | 1 | 0 | 0 |
| 1 | 0 | 1 | 1 | 1 | 1 | 0 | 1 | 1 | 0 | 0 | 1 | 1 | 1 | 0 | 1 |
| 1 | 0 | 1 | 1 | 1 | 1 | 1 | 0 | 1 | 0 | 0 | 1 | 1 | 1 | 1 | 0 |
| 1 | 0 | 1 | 1 | 1 | 1 | 1 | 1 | 1 | 0 | 0 | 1 | 1 | 1 | 1 | 1 |

TABLE XV

ASSIGNED SLOPE NUMBER = +1

| ADDRESS | | | | | | | | DATA | | | | | | | |
|---|---|---|---|---|---|---|---|---|---|---|---|---|---|---|---|
| t | t-1 | t-2 | sign | MAG. | | | | J | K | | sign | MAG. | | | |
| A7 | A6 | A5 | A4 | A3 | A2 | A1 | A0 | O7 | O6 | O5 | O4 | O3 | O2 | O1 | O0 |
| 1 | 1 | 0 | 0 | 0 | 0 | 0 | 0 | 0 | 1 | 0 | 0 | 0 | 0 | 0 | 1 |
| 1 | 1 | 0 | 0 | 0 | 0 | 0 | 1 | 0 | 1 | 0 | 0 | 0 | 0 | 1 | 0 |
| 1 | 1 | 0 | 0 | 0 | 0 | 1 | 0 | 0 | 1 | 0 | 0 | 0 | 0 | 1 | 1 |
| 1 | 1 | 0 | 0 | 0 | 0 | 1 | 1 | 0 | 1 | 0 | 0 | 0 | 1 | 0 | 0 |
| 1 | 1 | 0 | 0 | 0 | 1 | 0 | 0 | 0 | 1 | 0 | 0 | 0 | 1 | 0 | 1 |
| 1 | 1 | 0 | 0 | 0 | 1 | 0 | 1 | 0 | 1 | 0 | 0 | 0 | 1 | 1 | 0 |
| 1 | 1 | 0 | 0 | 0 | 1 | 1 | 0 | 0 | 1 | 0 | 0 | 0 | 1 | 1 | 1 |
| 1 | 1 | 0 | 0 | 0 | 1 | 1 | 1 | 0 | 1 | 0 | 0 | 1 | 0 | 0 | 0 |
| 1 | 1 | 0 | 0 | 1 | 0 | 0 | 0 | 0 | 1 | 0 | 0 | 1 | 0 | 0 | 1 |
| 1 | 1 | 0 | 0 | 1 | 0 | 0 | 1 | 0 | 1 | 0 | 0 | 1 | 0 | 1 | 0 |
| 1 | 1 | 0 | 0 | 1 | 0 | 1 | 0 | 0 | 1 | 0 | 0 | 1 | 0 | 1 | 1 |
| 1 | 1 | 0 | 0 | 1 | 0 | 1 | 1 | 0 | 1 | 0 | 0 | 1 | 1 | 0 | 0 |
| 1 | 1 | 0 | 0 | 1 | 1 | 0 | 0 | 0 | 1 | 0 | 0 | 1 | 1 | 0 | 1 |
| 1 | 1 | 0 | 0 | 1 | 1 | 0 | 1 | 0 | 1 | 0 | 0 | 1 | 1 | 1 | 0 |
| 1 | 1 | 0 | 0 | 1 | 1 | 1 | 0 | 0 | 1 | 0 | 0 | 1 | 1 | 1 | 1 |
| 1 | 1 | 0 | 0 | 1 | 1 | 1 | 1 | 0 | 1 | 0 | 0 | 1 | 1 | 1 | 1 |
| 1 | 1 | 0 | 1 | 0 | 0 | 0 | 0 | 0 | 1 | 0 | 0 | 0 | 0 | 0 | 1 |
| 1 | 1 | 0 | 1 | 0 | 0 | 0 | 1 | 1 | 1 | 0 | 0 | 0 | 0 | 0 | 0 |
| 1 | 1 | 0 | 1 | 0 | 0 | 1 | 0 | 1 | 0 | 0 | 1 | 0 | 0 | 0 | 1 |
| 1 | 1 | 0 | 1 | 0 | 0 | 1 | 1 | 1 | 0 | 0 | 1 | 0 | 0 | 1 | 0 |
| 1 | 1 | 0 | 1 | 0 | 1 | 0 | 0 | 1 | 0 | 0 | 1 | 0 | 0 | 1 | 1 |
| 1 | 1 | 0 | 1 | 0 | 1 | 0 | 1 | 1 | 0 | 0 | 1 | 0 | 1 | 0 | 0 |
| 1 | 1 | 0 | 1 | 0 | 1 | 1 | 0 | 1 | 0 | 0 | 1 | 0 | 1 | 0 | 1 |
| 1 | 1 | 0 | 1 | 0 | 1 | 1 | 1 | 1 | 0 | 0 | 1 | 0 | 1 | 1 | 0 |
| 1 | 1 | 0 | 1 | 1 | 0 | 0 | 0 | 1 | 0 | 0 | 1 | 0 | 1 | 1 | 1 |
| 1 | 1 | 0 | 1 | 1 | 0 | 0 | 1 | 1 | 0 | 0 | 1 | 1 | 0 | 0 | 0 |
| 1 | 1 | 0 | 1 | 1 | 0 | 1 | 0 | 1 | 0 | 0 | 1 | 1 | 0 | 0 | 1 |
| 1 | 1 | 0 | 1 | 1 | 0 | 1 | 1 | 1 | 0 | 0 | 1 | 1 | 0 | 1 | 0 |
| 1 | 1 | 0 | 1 | 1 | 1 | 0 | 0 | 1 | 0 | 0 | 1 | 1 | 0 | 1 | 1 |
| 1 | 1 | 0 | 1 | 1 | 1 | 0 | 1 | 1 | 0 | 0 | 1 | 1 | 1 | 0 | 0 |
| 1 | 1 | 0 | 1 | 1 | 1 | 1 | 0 | 1 | 0 | 0 | 1 | 1 | 1 | 0 | 1 |
| 1 | 1 | 0 | 1 | 1 | 1 | 1 | 1 | 1 | 0 | 0 | 1 | 1 | 1 | 1 | 0 |

TABLE XVI

ASSIGNED SLOPE NUMBER = +2

| ADDRESS | | | | | | | | DATA | | | | | | | |
|---|---|---|---|---|---|---|---|---|---|---|---|---|---|---|---|
| t | t-1 | t-2 | sign | MAG. | | | | J | K | | sign | MAG. | | | |
| A7 | A6 | A5 | A4 | A3 | A2 | A1 | A0 | O7 | O6 | O5 | O4 | O3 | O2 | O1 | O0 |
| 1 | 1 | 1 | 0 | 0 | 0 | 0 | 0 | 0 | 1 | 0 | 0 | 0 | 0 | 1 | 0 |
| 1 | 1 | 1 | 0 | 0 | 0 | 0 | 1 | 0 | 1 | 0 | 0 | 0 | 0 | 1 | 1 |
| 1 | 1 | 1 | 0 | 0 | 0 | 1 | 0 | 0 | 1 | 0 | 0 | 0 | 1 | 0 | 0 |
| 1 | 1 | 1 | 0 | 0 | 0 | 1 | 1 | 0 | 1 | 0 | 0 | 0 | 1 | 0 | 1 |
| 1 | 1 | 1 | 0 | 0 | 1 | 0 | 0 | 0 | 1 | 0 | 0 | 0 | 1 | 1 | 0 |
| 1 | 1 | 1 | 0 | 0 | 1 | 0 | 1 | 0 | 1 | 0 | 0 | 0 | 1 | 1 | 1 |
| 1 | 1 | 1 | 0 | 0 | 1 | 1 | 0 | 0 | 1 | 0 | 0 | 1 | 0 | 0 | 0 |
| 1 | 1 | 1 | 0 | 0 | 1 | 1 | 1 | 0 | 1 | 0 | 0 | 1 | 0 | 0 | 1 |
| 1 | 1 | 1 | 0 | 1 | 0 | 0 | 0 | 0 | 1 | 0 | 0 | 1 | 0 | 1 | 0 |
| 1 | 1 | 1 | 0 | 1 | 0 | 0 | 1 | 0 | 1 | 0 | 0 | 1 | 0 | 1 | 1 |
| 1 | 1 | 1 | 0 | 1 | 0 | 1 | 0 | 0 | 1 | 0 | 0 | 1 | 1 | 0 | 0 |
| 1 | 1 | 1 | 0 | 1 | 0 | 1 | 1 | 0 | 1 | 0 | 0 | 1 | 1 | 0 | 1 |
| 1 | 1 | 1 | 0 | 1 | 1 | 0 | 0 | 0 | 1 | 0 | 0 | 1 | 1 | 1 | 0 |
| 1 | 1 | 1 | 0 | 1 | 1 | 0 | 1 | 0 | 1 | 0 | 0 | 1 | 1 | 1 | 1 |
| 1 | 1 | 1 | 0 | 1 | 1 | 1 | 0 | 0 | 1 | 0 | 0 | 1 | 1 | 1 | 1 |
| 1 | 1 | 1 | 0 | 1 | 1 | 1 | 1 | 0 | 1 | 0 | 0 | 1 | 1 | 1 | 1 |
| 1 | 1 | 1 | 1 | 0 | 0 | 0 | 0 | 0 | 1 | 0 | 0 | 0 | 0 | 1 | 0 |
| 1 | 1 | 1 | 1 | 0 | 0 | 0 | 1 | 0 | 1 | 0 | 0 | 0 | 0 | 0 | 1 |
| 1 | 1 | 1 | 1 | 0 | 0 | 1 | 0 | 1 | 1 | 0 | 0 | 0 | 0 | 0 | 0 |
| 1 | 1 | 1 | 1 | 0 | 0 | 1 | 1 | 1 | 0 | 0 | 1 | 0 | 0 | 0 | 1 |
| 1 | 1 | 1 | 1 | 0 | 1 | 0 | 0 | 1 | 0 | 0 | 1 | 0 | 0 | 1 | 0 |
| 1 | 1 | 1 | 1 | 0 | 1 | 0 | 1 | 1 | 0 | 0 | 1 | 0 | 0 | 1 | 1 |
| 1 | 1 | 1 | 1 | 0 | 1 | 1 | 0 | 1 | 0 | 0 | 1 | 0 | 1 | 0 | 0 |
| 1 | 1 | 1 | 1 | 0 | 1 | 1 | 1 | 1 | 0 | 0 | 1 | 0 | 1 | 0 | 1 |
| 1 | 1 | 1 | 1 | 1 | 0 | 0 | 0 | 1 | 0 | 0 | 1 | 0 | 1 | 1 | 0 |
| 1 | 1 | 1 | 1 | 1 | 0 | 0 | 1 | 1 | 0 | 0 | 1 | 0 | 1 | 1 | 1 |
| 1 | 1 | 1 | 1 | 1 | 0 | 1 | 0 | 1 | 0 | 1 | 1 | 0 | 0 | 0 | |
| 1 | 1 | 1 | 1 | 1 | 0 | 1 | 1 | 1 | 0 | 0 | 1 | 1 | 0 | 0 | 1 |
| 1 | 1 | 1 | 1 | 1 | 1 | 0 | 0 | 1 | 0 | 0 | 1 | 0 | 1 | 0 | |
| 1 | 1 | 1 | 1 | 1 | 1 | 0 | 1 | 1 | 0 | 0 | 1 | 1 | 0 | 1 | 1 |
| 1 | 1 | 1 | 1 | 1 | 1 | 1 | 0 | 1 | 0 | 0 | 1 | 1 | 1 | 0 | 0 |
| 1 | 1 | 1 | 1 | 1 | 1 | 1 | 1 | 1 | 0 | 0 | 1 | 1 | 1 | 0 | 1 |

In the above TABLES (sign=1=+) and (sign=0=−). As previously stated at the start of the add phase latch circuit 25 is reset and stores therein all zeros. Now assume that phone A provides bits t, t-1 and t-2 equal to 000. This CVSD bit combination has an assigned slope number of −2 for memory 23 as shown in TABLE I. Since circuit 25 has all zeros therein we go to memory adder 23 as indicated at row 49 of TABLE I and the answer or data is 00010, which is sent to circuit 25. Now assume that phone B provides bits t, t-1 and t-2 equal to 001. This CVSD bit combination has an assigned slope number of −1 as shown in TABLE II. Since circuit 25 has the combination 00010 stored therein we go to memory adder 23 as indicated at row 50 of TABLE II and the answer or data is 00011 which is sent to circuit 25. As far as the slope number is concerned the operation $(-2)+(-1)=-3$ has been performed. Now assume that phone C provides bits t, t-1 and t-2 equal to 010. This CVSD bit combination has an assigned slope number of 0 as shown in TABLE III. Since circuit 25 has the combination 00011 stored therein we go to memory adder 23 as indicated at row 51 of TABLE III and the answer or data is still 00011 which is sent to circuit 25. Now assume that phone D provides bits t, t-1 and t-2 equal to 101. This CVSD bit combination has an assigned slope number of 0 as shown in TABLE VI. Since circuit 25 has the combination 00011 stored therein we go to memory adder 23 as indicated at row 52 of TABLE VI and the answer or data is still 00011 which is sent to circuit 25. Now assume that phone E provides bits t, t-1 and t-2 equal to 110. This CVSD bit combination has an assigned slope number of +1 as shown in TABLE VII. Since circuit 25 has the combination 00011 stored therein we go to memory adder 23 as indicated at row 53 of TABLE VII and the answer or data is 00010 which is sent to circuit 25. Now assume that phone F provides bits t, t-1 and t-2 equal to 111. This CVSD bit combination has an assigned slope number of +2 as shown in TABLE VIII. Since circuit 25 has the combination 00010 stored therein we go to memory adder 23 as indicated at row 54 of TABLE VIII and the answer or data is 00000 which is sent to circuit 25. As far as the slope number is concerned the total operation performed is $(-2)+(-1)+(0)+(0)+(+1)+(+2)=0$. It should be noted that the bits t, t-1 and t-2 may have combinations different than the ones assumed above, but the same procedure is followed, namely, the bit combinations present in circuit 25 tells what row of a particular assigned slope number memory table to enter for the slope number of the next phone entering bits from buses 5–7 to memory adder 23 and the next sum entered in circuit 25 is found on that row entered under the data columns.

The subtraction procedure is similar. At the end of the add phase, circuit 25 for the above assumed condition had the total combination 00000 stored therein and will remain as such through the subtract phase. Now assume that phone A provides bit t, t-1 and t-2 equal to 000. This CVSD bit combination has an assigned slope number of −2 as shown in TABLE IX. Since circuit 25 has the combination 00000 stored therein we go to memory subtractor 22 as indicated at row 55 of TABLE IX and the answer or data is 10010010. The five least significant bits 10010 merely represent the sign and magnitude of the result. Since as shown in FIG. 2, the only portion of the answer or data employed are the two most significant bits $O_7$ and $O_6$ which are found under the J and K columns. Thus, with the two most significant numbers being 10 the JK-type flip flop 36 is forced to provide a logic "1" output. Now assume that phone B provides bit t, t-1 and t-2 equal to 001. This CVSD bit combination has an assigned slope number of −1 as shown in TABLE X. Since the combination 00000 is still the total sum, residing in circuit 25, we go to memory subtractor 22 as indicated at row 56 of TABLE X and the answer or data is 10010001 with the five least significant bits 10001 representing only the present subtraction result. Looking at the two most significant bits we have the bit combination 10 which forces the JK-type flip flop 37 to provide a logic "1" output. As far as the assigned slope numbers are concerned the subtraction operations just performed are $(0)-(-2)=+2$ and $(0)-(-1)=+1$. This process will continue for the remainder of the phones during the subtract phase with the TABLE being employed corresponding to the assigned slope number determined by the combination of the CVSD bits t, t-1 and t-2 with entrance to the memory subtractor 22 TABLE being determined by the five least significant bits as stored in circuit 25 at the end of the add phase. It should be noted that the combination 10 of the two most significant bits would force any flip flop 36–41 to provide a logic "1" output while the combination 01 of the two most significant bits would force any flip flop 36–41 to provide a logic "0" output and that the associated D-type flip flops 42–47 are clocked at once at the bit interval to provide the same CVSD logic output as their associated flip flops 36–41. If the combination of the two most significant bits is 11, then any JK-flip flop 36–41 will toggle, that is, the output of the flip flop will change its state during its subtraction period.

While I have described above the principles of my invention in connection with specific apparatus it is to be clearly understood that this description is made only by way of example and not as a limitation to the scope of my invention as set forth in the objects thereof and in the accompanying claims.

I claim:
1. An all digital delta modulation telephone conference circuit comprising:
   first digital means to separately store in succession a plurality of sequential bits in each of a plurality of input delta modulation bit streams each originating from a different one of a plurality of phones, each of said plurality of bits being capable of having a plurality of different bit combinations, each of said plurality of different bit combinations being assigned a predetermined slope number, wherein said slope number indicates slope information of an analog signal represented by each of said plurality of streams; and
   second digital means coupled to said first means for sequentially receiving each of said plurality of bits, for adding from each bit stream correspondingly-occurring first binary bit combinations determined by said slope number assigned to each of said received plurality of bits to produce a sum digital signal including information from each of said phones, and for subtracting second binary bit combinations determined by said slope number assigned to each of said received plurality of bits from said sum digital signal to produce a plurality of output conference delta modulation bit streams each for a different one of said plurality of phones and each including information from all of said plurality of phones minus information from the associated one of said plurality of phones.

2. A circuit according to claim 1, wherein said second means first performs said adding and then performs said subtracting.

3. A circuit according to claim 2, wherein said first means includes
a given number of a plurality of cascade connected input storage circuits, said given number being equal in number to said plurality of phones and each of said plurality of storage circuits is coupled to a different one of said plurality of phones.

4. A circuit according to claim 3, wherein each of said plurality of input storage devices is a flip flop.

5. A circuit according to claim 4, wherein each of said flip flops is a D-type flip flop.

6. A circuit according to claim 5, wherein said given number is six.

7. A circuit according to claim 2, wherein said plurality of phones number six.

8. A circuit according to claim 6, wherein said second means includes
a programmable read only memory adder programmed with said first binary bit combinations to enable addition of said first binary bit combinations determined by said slope number, and
a latch circuit coupled to a predetermined number of outputs of said adder and a predetermined number of address inputs to store a running sum of said addition.

9. A circuit according to claim 8, wherein said second means further includes
a programmable read only memory subtractor programmed with said second binary bit combinations to enable subtraction of said second binary bit combinations from the total sum stored in said latch circuit.

10. A circuit according to claim 9, wherein said latch circuit includes
a predetermined number of flip flops.

11. A circuit according to claim 10, wherein each of said flip flops is a D-type flip flop.

12. A circuit according to claim 11, wherein said predetermined number of outputs are the five least significant outputs, and
said predetermined number of address inputs are the five least significant address inputs.

13. A circuit according to claim 12, wherein said latch circuit is coupled to the five least significant address inputs of said subtractor.

14. A circuit according to claim 13, wherein said second means further includes
a tri-state buffer coupled to each of said plurality of input storage devices and a given number of address inputs of said adder and said subtractor, and
a first source of timing signals to sequentially enable groups of said buffers to couple each of said plurality of bits in sequence to said given number of address inputs when said second means is adding and subtracting.

15. A circuit according to claim 14, wherein said given number of address inputs are the three most significant address inputs.

16. A circuit according to claim 15, wherein said second means further includes
an intermediate sequential storage circuit coupled to the two most significant outputs of said subtractor to store sequentially in said intermediate storage circuit the result of subtraction in said subtractor, and
a second source of timing signals to sequentially control said intermediate storage circuit when adding.

17. A circuit according to claim 16, wherein said intermediate storage circuit includes
a plurality of flip flops equal in number to said plurality of phones.

18. A circuit according to claim 17, wherein each of said flip flops is a JK-type flip flop.

19. A circuit according to claim 18, wherein each of said first and second source of timing signals include
a four-stage Johnson octal counter.

20. A circuit according to claim 19, wherein said second means further includes
a plurality of output storage circuits equal in number to said plurality of phones, each of said output storage circuits being coupled to a different of said flip flops of said intermediate storage circuit, each of said output storage circuit providing a different one of said plurality of conference bit streams.

21. A circuit according to claim 20, wherein each of said plurality of output storage circuits include
a flip flop.

22. A circuit according to claim 21, wherein each of said flip flops is a D-type flip flop.

23. A circuit according to claim 2, wherein said second means includes
a programmable read only memory adder programmed with said first binary bit combinations to enable addition of said first binary bit combinations determined by said slope number, and
a latch circuit coupled to a predetermined number of outputs of said adder and a predetermined number of address inputs to store a running sum of said addition.

24. A circuit according to claim 23, wherein said second means further includes
a programmable read only memory subtractor programmed with said second binary bit combinations to enable subtraction of said second binary bit combinations from the total sum stored in said latch circuit.

25. A circuit according to claim 24, wherein said latch circuit includes
a predetermined number of flip flops.

26. A circuit according to claim 25, wherein each of said flip flops is a D-type flip flop.

27. A circuit according to claim 26, wherein said predetermined number of outputs are the five least significant outputs, and
said predetermined number of address inputs are the five least significant address inputs.

28. A circuit according to claim 27, wherein said latch circuit is coupled to the five least significant address inputs of said subtractor.

29. A circuit according to claim 28, wherein said second means further includes
a tri-state buffer coupled to said first means and a given number of address inputs of said adder and said subtractor, and a first source of timing signals to sequentially enable groups of said buffers to couple each of said plurality of bits in sequence to said given number of address inputs when said second means is adding and subtracting.

30. A circuit according to claim 29, wherein
said given number of address inputs are the three most significant address inputs.

31. A circuit according to claim 30, wherein
said second means further includes
an intermediate sequential storage circuit coupled to the two most significant outputs of said subtractor to store sequentially in said intermediate storage circuit the result of subtraction in said subtractor, and
a second source of timing signals to sequentially control said intermediate storage circuit when adding.

32. A circuit according to claim 31, wherein
said intermediate storage circuit includes
a plurality of flip flops equal in number to said plurality of phones.

33. A circuit according to claim 32, wherein
each of said flip flops is a JK-type flip flop.

34. A circuit according to claim 33, wherein
each of said first and second source of timing signals include
a four-stage Johnson octal counter.

35. A circuit according to claim 34, wherein
said second means further includes
a plurality of output storage circuits equal in number to said plurality of phones, each of said output storage circuits being coupled to a different of said flip flops of said intermediate storage circuit, each of said output storage circuit providing a different one of said plurality of conference bit streams.

36. A circuit according to claim 35, wherein
each of said plurality of output storage circuits include
a flip flop.

37. A circuit according to claim 36, wherein
each of said flip flops is a D-type flip flop.

* * * * *